United States Patent [19]
Waldrop et al.

[11] Patent Number: 6,024,419
[45] Date of Patent: Feb. 15, 2000

[54] RAILCAR BRAKING SYSTEM

[75] Inventors: Jeremy S. Waldrop; Bryan J. Clarke, both of Aurora, Ill.

[73] Assignee: Zeftron, Inc., Montgomery, Ill.

[21] Appl. No.: 09/251,099

[22] Filed: Feb. 16, 1999

Related U.S. Application Data

[60] Provisional application No. 60/074,812, Feb. 17, 1998.

[51] Int. Cl.[7] ............................... B60T 13/74; B60T 7/00
[52] U.S. Cl. .................................... 303/3; 303/7; 303/15; 303/20
[58] Field of Search .................................. 303/3, 7, 15, 20

[56] References Cited

U.S. PATENT DOCUMENTS

| | | |
|---|---|---|
| 4,344,138 | 8/1982 | Frasier . |
| 4,402,047 | 8/1983 | Newton et al. . |
| 4,652,057 | 3/1987 | Engle et al. . |
| 5,172,316 | 12/1992 | Root et al. . |
| 5,222,788 | 6/1993 | Dimsa et al. ............................ 303/15 |
| 5,335,974 | 8/1994 | Klink . |
| 5,358,315 | 10/1994 | Balukin ...................................... 303/15 |
| 5,503,469 | 4/1996 | Cunkelman ................................ 303/15 |
| 5,509,727 | 4/1996 | Hart et al. . |
| 5,564,794 | 10/1996 | Hart . |
| 5,572,187 | 11/1996 | Williford . |
| 5,586,813 | 12/1996 | McKay et al. ........................ 303/9.69 |
| 5,662,389 | 9/1997 | Truglio et al. . |
| 5,662,391 | 9/1997 | McKay . |
| 5,722,736 | 3/1998 | Cook ......................................... 303/15 |

OTHER PUBLICATIONS

Minimatic Modular Components, Clippard Minimatic Catalog 484, 38 pages (1990).

*Primary Examiner*—Matthew C. Graham
*Assistant Examiner*—Robert A. Siconolfi
*Attorney, Agent, or Firm*—Lloyd L. Zickert

[57] ABSTRACT

A pneumatic railcar braking system for freight or passenger cars, wherein the system is operable as an electronically controlled pneumatic brake system in conjunction with a head end unit in the locomotive or as a conventional pneumatic brake system in conjunction with a pneumatic brake control in the locomotive.

59 Claims, 14 Drawing Sheets

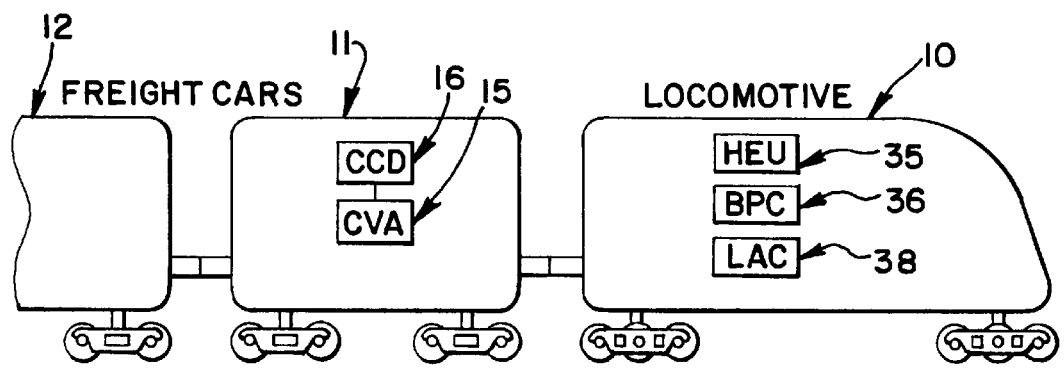
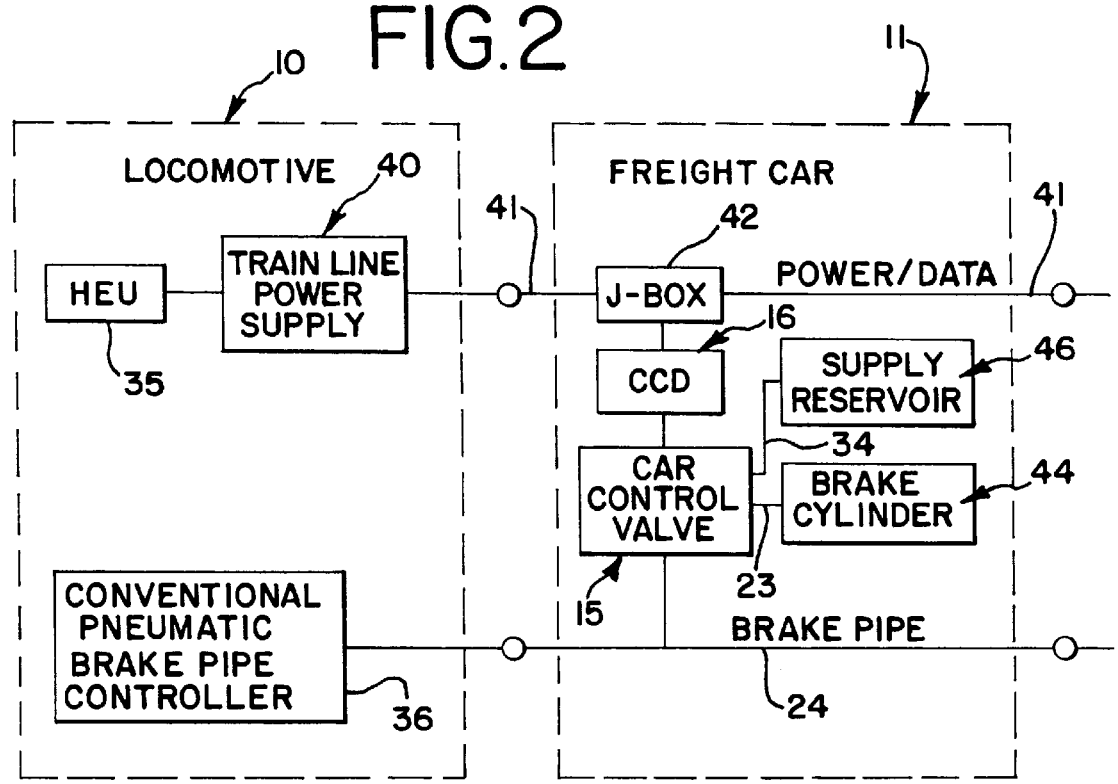

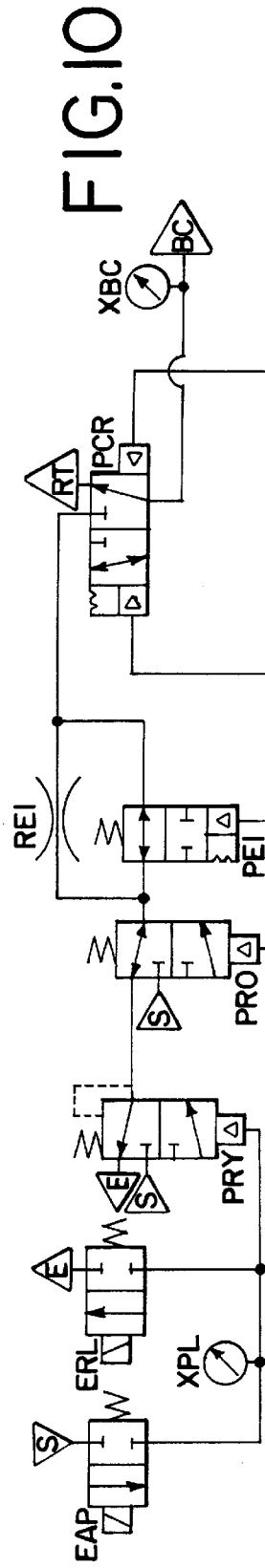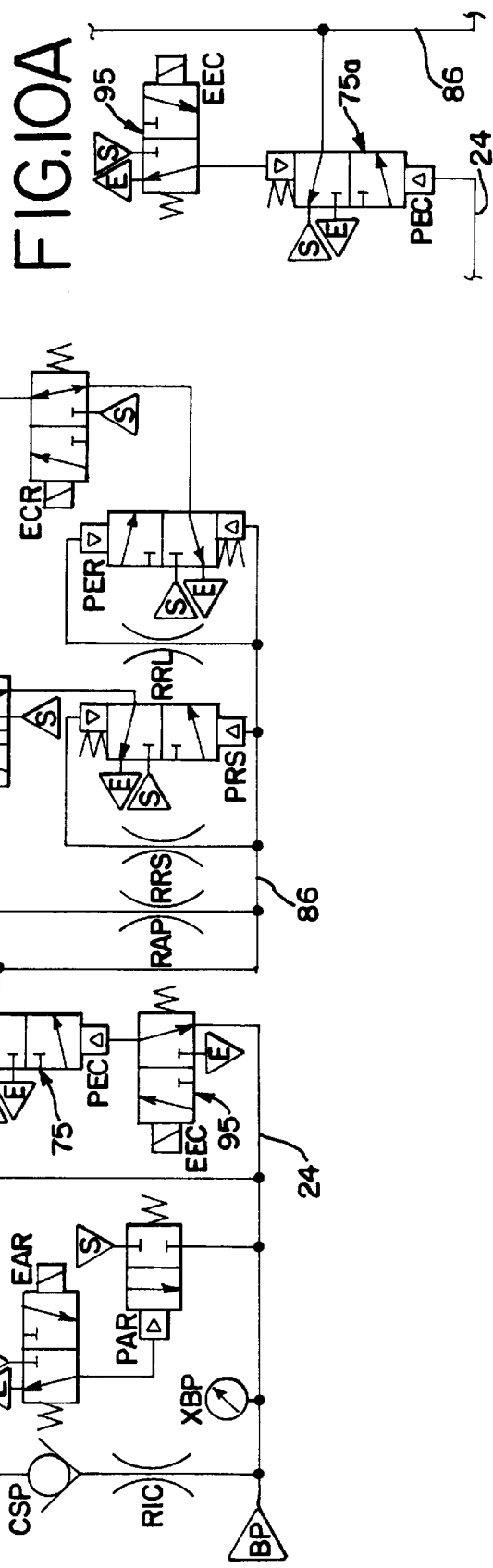
FIG.10
FIG.10A

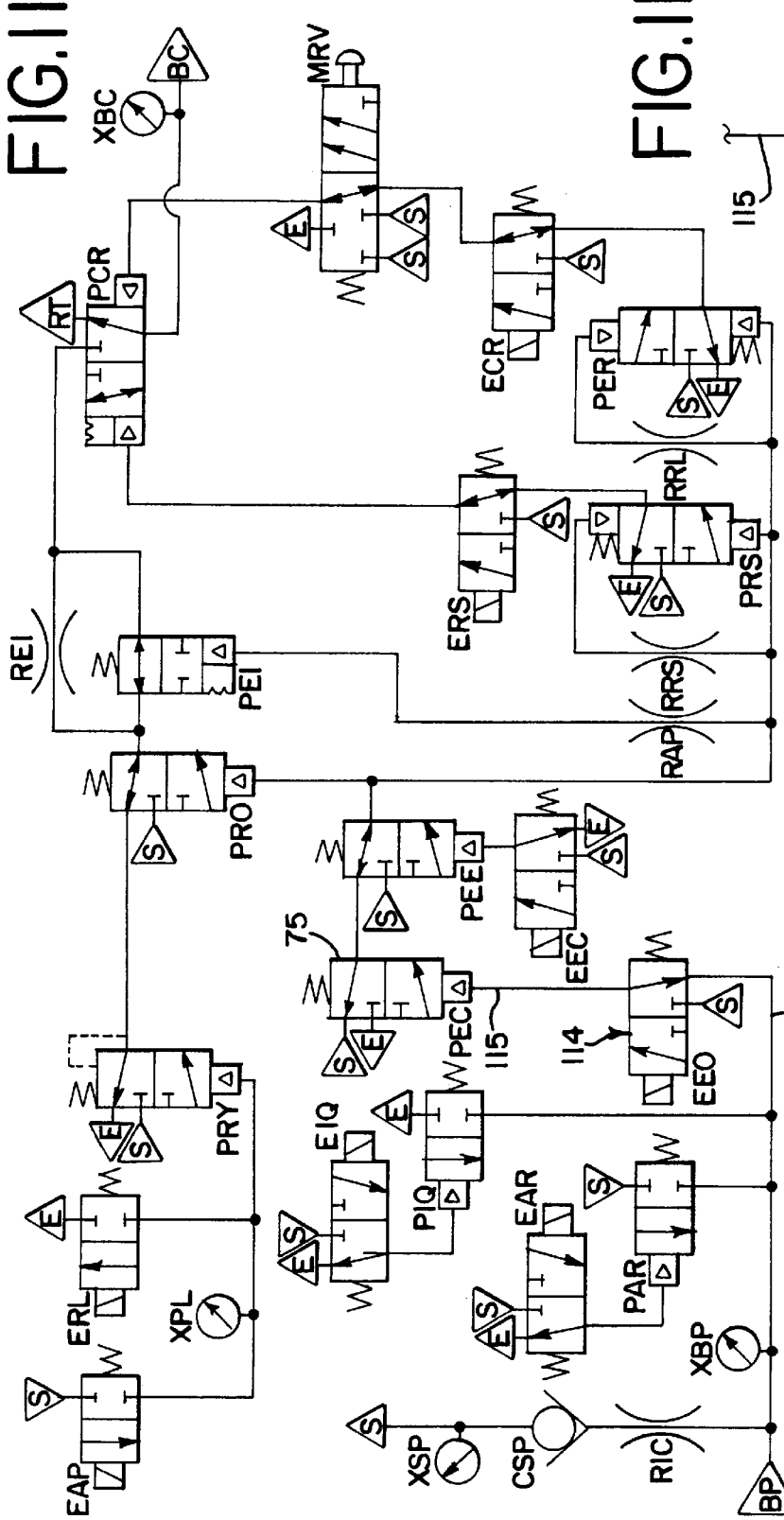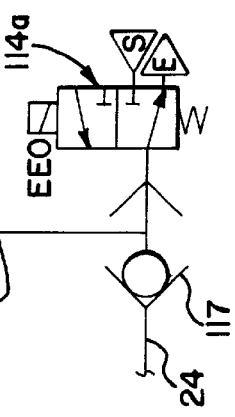
FIG.11
FIG.11A

RAILCAR BRAKING SYSTEM

DESCRIPTION

This application claims the benefit of U.S. provisional application Ser. No. 60/074,812 filed Feb. 17, 1998.

This invention relates in general to a brake control system for railcars operable in response to electronic and/or pneumatic signals/commands and which reduces braking distances.

BACKGROUND OF THE INVENTION

It is well known that for many years railroad trains in North America, Europe, and other parts of the world have been equipped with some form of automatic pneumatic brake systems which are sometimes referred to as air brakes. The heretofore known strictly pneumatic brake system provides a simple, reliable and generally fail-safe means for permitting the engineer, conductor, or train crew to apply the brakes throughout the train. Such a pneumatic brake system includes an air compressor on the locomotive connected to a brake pipe extending throughout the train for providing compressed air to all of the cars and for operating brake cylinders on the cars which, through a rigging, apply braking action to the wheels of the cars. Pneumatic commands or signals are given by the engineer to the brake pipe which are sensed by control valves on each of the cars to apply braking functions. Generally speaking, when the reduction of air pressure is sensed in a brake pipe, brakes are applied, and when an increase in pressure is sensed, the brakes are released. Further, the degree of braking is in proportion to the value and rate of the reduction, although once brake pipe pressure begins to increase, the brakes are released completely.

A strictly pneumatic brake system has shortcomings particularly when used in a long freight train such as one having 150 cars being up to one and one-half miles long. For this length of train, it takes approximately eighteen seconds for the air pressure reduction initiated in the locomotive to reach the last car in the train. Accordingly, only a slight reduction in pressure is generally initiated by the engineer to prevent the last cars of the train from running into the cars with brakes applied strongly. Consequently, full pressure braking is delayed and braking distances are longer.

In order to solve the problems existing in strictly pneumatic braking systems, electronically controlled pneumatic brake systems (ECP systems) have been proposed in recent years and are currently being tested. For example, such a system is disclosed in U.S. Pat. Nos. 5,335,974; 5,722,736, and 5,924,774, all owned by the assignee of this application. It has been shown that ECP systems which incorporate a part of the automatic pneumatic brake system equipment on cars and controlled by a head-end unit (HEU) or master controller from the locomotive substantially improves braking and substantially reduces braking distances by providing substantially instantaneous and simultaneous brake signals to all of the cars so that they may brake at substantially the same time.

However, it is virtually impossible to completely retrofit all cars in existence at one time, and therefore a brake system capable of ECP operation must also be capable of strictly pneumatic operation, as more likely than not some of the cars on a train will not have the ECP system, and then control from the locomotive will be from a pneumatic controller.

It will be understood that full ECP systems require each car to be equipped with a car control device (CCD), and the locomotive with an HEU.

SUMMARY OF THE INVENTION

The brake system of the present invention includes an electronic car control device and a car valve assembly retrofittable on standard pipe brackets of railcars. Power for the CCD may be taken from the train line or from a local power generation system mounted on the car. The car control valve incorporates part of the pneumatic brake system equipment on a car which would include the brake pipe, the reservoir tanks, the brake cylinders, the retainer valve, manual brake cylinder release linkage, and the rigging or linkage between the brake cylinders and the braking elements. The brake system of the invention is capable of operating in either the emulation or pure ECP mode, while also accomplishing smooth transition between modes. When operating in the emulation mode, the brakes operate in substantially the same manner as the strictly pneumatic conventional systems. When operating in the ECP mode, the system is controlled electronically by commands given by the engineer in the locomotive. Thus, the system of the invention is universal in nature in that it can be retrofitted on present day railcars, which railcars can be mixed with other cars that have strictly pneumatic braking systems while also having the capability of operating on trains with pure ECP systems. In the ECP mode, brake cylinder pressure is controlled through a computer controlled network wherein each car is equipped with a CCD and a locomotive is equipped with an HEU. The engineer instructs the HEU to apply a percentage of full service brake cylinder pressure wherein the HEU simultaneously sends a corresponding signal to each CCD. Then the CCD on each car calculates the amount of brake cylinder pressure in response to the electronic signals issued by the HEU, other preprogrammed car information, and other inputs. The CCD then instructs the valve manifold through solenoid controlled valves to fill and exhaust the brake cylinders in accordance with these on-line calculations as ordered by the HEU.

The brake system of the present invention significantly reduces brake pressure build-up time and braking distances in the ECP mode by providing substantially instantaneous and simultaneous uniform application of brakes on all cars in the train. Further, this system facilitates the substantial increase in braking control, provides a graduated release of the braking application, increases the uniformity of braking which diminishes brake-related damage and extends wheel life, constantly recharges the supply reservoir during normal operation including braking applications, dramatically reduces brake-induced slack action between the cars, decreases the time spent in charging and testing the system during setup, thereby reducing terminal delays and also functions on three-pack or five-pack articulated sets of cars. Accordingly, better all-around braking of the train is provided by the system of the present invention when in the ECP mode which allows the train to run faster and more efficiently.

The braking system of the invention includes a car control valve assembly responsive to electric signals from a car control device in the form of a computer. When functioning in the emulation mode, the braking system electronically simulates the function of the strictly pneumatic conventional system. Pressure transducers continually monitor pressures in the valve assembly and apply or release the brake of the car accordingly as pneumatic signals or commands are received in the brake pipe from the locomotive. Power is generated for each CCD locally, for example, by use of an axle generator, solar power, pneumatic rotary generator, vibration generator, batteries, or any other suitable source.

Since the CCD operates on low power consumption, local power generation can be easily provided. However, if a train line is provided which can supply power, the local power generation need not be used.

The advantages of the emulation mode of the present invention over the operation of prior strictly pneumatic systems particularly occurs in the transitional period from conventional to ECP systems. This permits car owners to operate trains conventionally until the entire fleet of cars is retrofitted with ECP systems. It is contemplated that this transitional period may take many years for the entire fleet, although some trains will have pure ECP systems. Further, the system of the present invention, when in emulation mode, performs better than the purely pneumatic conventional valve it is emulating. Particularly, the present system in the emulation mode uses air more efficiently in logic operations. Moreover, it is more sensitive in recognizing pressure changes which accelerate initial quick service and accelerated release functions. Finally, it is lighter, easier to install, and easier to maintain than a conventional valve system, and is adapted to be connected to the conventional retainer valve.

Accordingly, it is an object of the present invention to provide a new and improved braking system capable of operating in an ECP mode or an emulation mode and which provides more efficient braking operations to allow the train equipped with the system to run faster.

A further object of the present invention is to provide a braking system capable of operating in the ECP mode or emulation mode, and which is also capable of incorporating for use the standard retainer valve used on cars and operable by a trainman in order to control braking operations.

A further object of the present invention is to provide a braking system capable of operating in the ECP mode or the emulation mode, and which, when operating in the emulation mode, accelerates the performance of recognizing a pneumatic emergency through use of pressure transducers that immediately recognize a pressure drop in the brake pipe and signals operation of an electronic emergency charge valve for application of brakes.

A further object of the present invention is to provide a braking system capable of operating in the ECP mode and the emulation mode which includes a leak-tolerant pneumatic circuit that will not adversely affect the operation of the control valve assembly.

Another object of the present invention is to provide an improved brake system capable of operating in the ECP mode or in the emulation mode and which includes an inshot valve arrangement for facilitating the application of brakes in an emergency.

Other objects, features and advantages of the invention will be apparent from the following detailed disclosure, taken in conjunction with the accompanying sheets of drawings, wherein like reference numerals refer to like parts.

DESCRIPTION OF THE DRAWINGS

FIG. 1 is a somewhat schematic view of a train illustrating a locomotive and two freight cars and which incorporates the braking system of the invention;

FIG. 2 is a block diagram which illustrates operation of the present system in the ECP mode;

FIG. 10 is a schematic view of the pneumatic circuitry of a modified control valve assembly of the present invention using conventional ANSI symbols wherein the pneumatic emergency circuit of the control valve is simplified for the elimination of the pneumatic electronic emergency charge valve shown in FIG. 3;

FIG. 10A is a schematic view of a variation of the pneumatic emergency circuit shown in FIG. 10;

FIG. 11 is a schematic view of the pneumatic circuitry of a further modified control valve assembly of the present invention using conventional ANSI symbols which further includes an electronic emergency override valve in the pneumatic emergency circuit to prevent certain cases where pressure-sensitive emergency applications are not allowed in a conventional braking system;

FIG. 11A is a schematic view of a variation of the emergency electronic override valve feature shown in FIG. 11;

DESCRIPTION OF THE INVENTION

Figure 6:
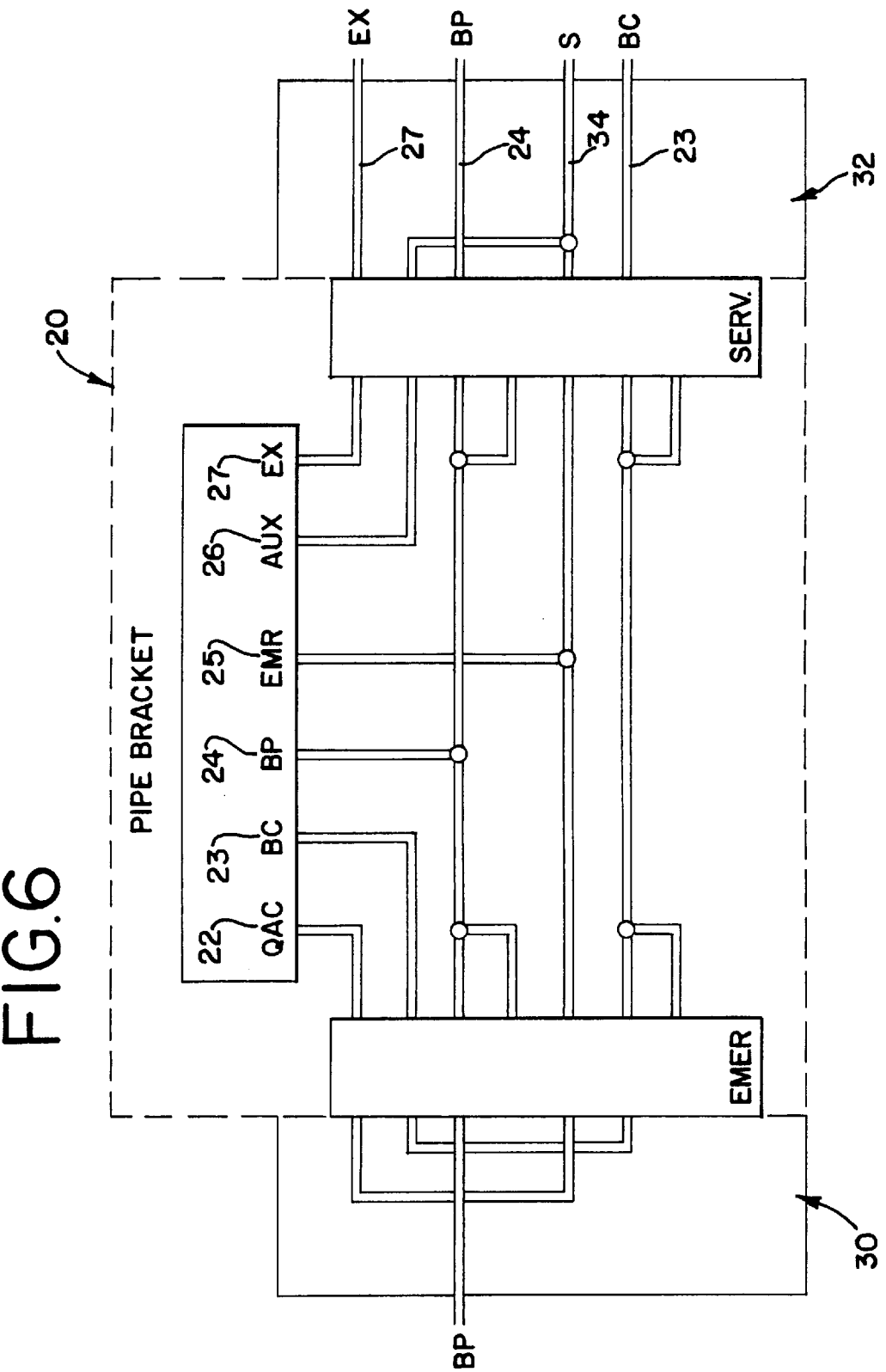
FIG. 6 is a schematic diagram of the pipe bracket showing the emergency side manifold and the service side manifold to which the control valve assembly of the present invention will be connected.

Referring now to the drawings, and particularly to FIG. 1, a train is diagrammatically illustrated including a locomotive 10, a first freight car 11, and a second freight car 12. It will be appreciated that a train would include any number of freight cars or could include passenger cars. With respect to freight car trains, a long train may include 150 cars and extend up to one and one-half miles long. The present invention concerns a braking system for these cars that would include as shown in FIG. 1 a car control valve assembly 15 (CVA) and a car control device 16 (CCD) which includes a CPU or computer 17. The car control valve assembly 15 would be suitably mounted on the pipe bracket of a car, which as shown in FIG. 6 is designated by the numeral 20, and which would include manifolds on the emergency and service sides. The control valve assembly 15 of the invention is mounted on the service side of the pipe bracket, as seen in FIG. 6. For illustrating the pipe bracket plumbing, the plumbing connections include a quick action chamber 22 (QAC) which is located within the pipe bracket, the brake cylinder line 23 connected to the brake cylinder, the brake pipe line 24 connected to the brake pipe, the emergency reservoir line 25 connected to the emergency reservoir, the auxiliary reservoir 26 connected to the auxiliary reservoir, and the exhaust line 27 connected to the retainer valve. Hereafter, these plumbing connections will be sometimes merely called by their names in order to clarify the air flow as controlled by the control valve assembly.

For the present invention, a manifold 30 is mounted on the emergency side of the pipe bracket and a manifold 32 is mounted on the service side of the pipe bracket. The control valve of the present invention is for the most part connected to the service side of the pipe bracket and thereby will facilitate retrofitting and be familiar to the railroad personnel working with the valves. As can be seen in FIG. 6, the emergency and auxiliary reservoirs are interconnected, as well as the quick action chamber. It is not necessary to include the quick action chamber in the pneumatic circuit, although it does add some volume to the overall air available for use in operating the braking system. For purposes of relating to the valve control assembly that will be hereafter described, the combination of the emergency, auxiliary and quick action chamber tanks will be considered the air supply or supply reservoir and at the line 34.

Figure 16:
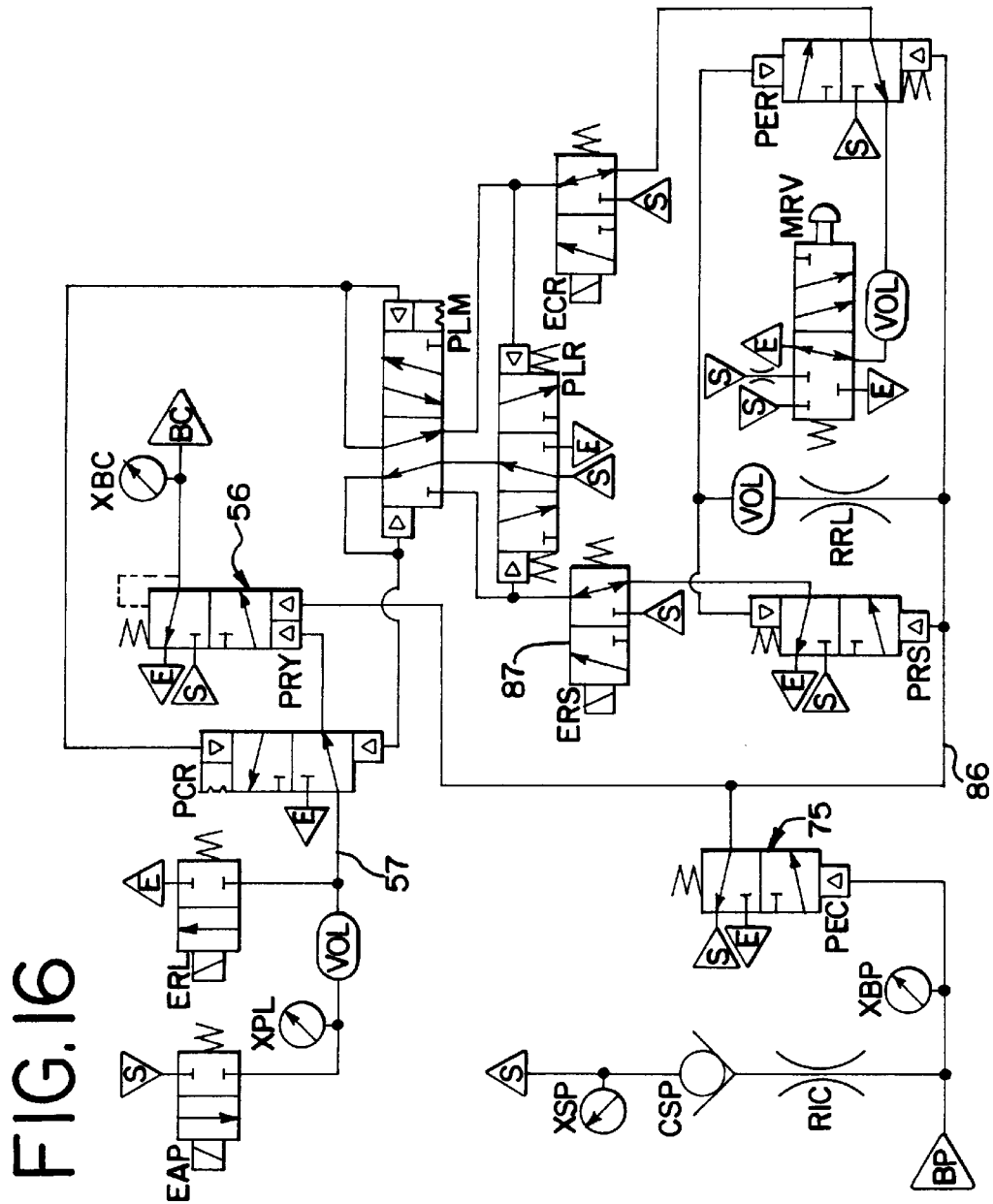
FIG. 16 is a schematic view of the pneumatic circuitry of a modified control valve assembly of the present invention which is only used for electronic operation of the brake system.

Except for the embodiment of FIG. 16, the braking system of the invention can operate in the ECP mode by receiving electronic commands from the locomotive or in the emulation mode by receiving pneumatic commands from the locomotive. The system in FIG. 16 can only be controlled in the ECP mode. As seen particularly in FIG. 1, where the locomotive includes a head-end unit (HEU) or master controller 35, it would be capable of generating electronic signals to the car control device 16 of the braking system of the invention. These signals would generally be transmitted along a train line but could alternately be transmitted by wireless equipment. The locomotive would also include a pneumatic brake pipe controller (BPC) 36 and a locomotive air compressor (LAC) 38 for supplying air to a large tank or reservoir which is connected to the brake pipe. The pneumatic brake pipe controller would be used to transmit pneumatic commands or signals through the brake pipe to the car control valve assemblies.

As seen in FIG. 2, a block diagram of the train including a locomotive 10 and freight car 11 is illustrated to show the various components that would be used in connection with a train where the locomotive is not only equipped with an HEU but also a conventional pneumatic brake pipe controller. Thus, the locomotive 10 in FIG. 2 includes an HEU 35 and a pneumatic brake pipe controller 36 and which will function to control the ECP/emulation brake system of the present invention as well as the standard pneumatic braking systems that are on railcars today. Accordingly, a train made up of several cars having an ECP system like in the present invention could also include a car having a conventional pneumatic braking system and the locomotive could control braking throughout the train in the ECP mode and the emulation mode. The brake pipe controller 36 is connected to the brake pipe 24 so that conventional pneumatic commands or signals can be sent through the brake pipe by a reduction or increase in the brake pipe pressure. Additionally, the locomotive would include a trainline power supply 40 for supplying power to the car control devices of an ECP system according to the present invention along a train line 41. As seen in FIG. 2, the train line power supply would be connected to an electrical junction box (j-BOX) 42 on a freight car, which in turn would provide a connection to the car control device 16 through the power line 41. The car control valve 15 of the invention would be electronically interconnected to the car control device 16 and additionally pneumatically connected to the brake pipe 24 as well as the brake cylinders 44 and the supply reservoir 46, which would be connected to the supply line 34. For purposes hereafter in describing the invention and particularly the car control valve and the car control device, reference will be made to the supply reservoir as supplying air to the car control valve rather than the various reservoirs that are normally provided on a freight car. The supply reservoir on each car would then accordingly include the emergency and auxiliary reservoirs and optionally the quick action chamber to provide the maximum air volume for braking.

Figure 5:
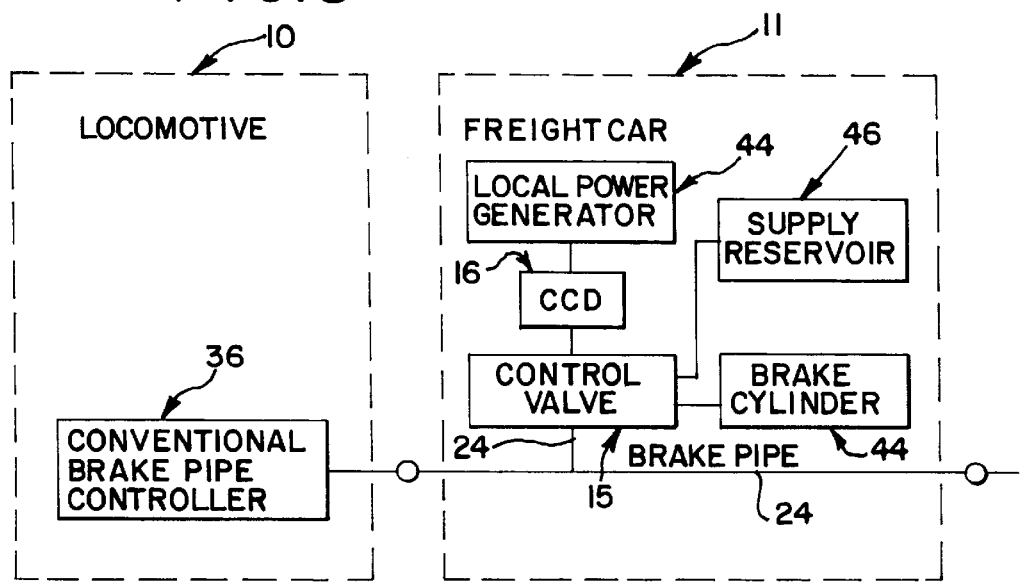
FIG. 5 is a block diagram illustrating the emulation mode of the present invention.

The braking system of the invention, when used on freight cars pulled by a locomotive not having an HEU, will then be operable in the emulation mode and a block diagram illustrating the general components is shown in FIG. 5 wherein locomotive 10 only includes the conventional pneumatic brake pipe controller 36 for the brake pipe 24. It should be appreciated the braking system will also operate in the emulation mode where an HEU is provided upon failure of the HEU 35 or power line loss to the car control device after a full service application and release or a one hour time period. When the brake system of the invention is operable in the emulation mode, it will then respond to pneumatic commands or signals. An illustration in block form of the emulation mode is shown in FIG. 5 wherein the locomotive merely includes a conventional brake pipe controller which is connected to the brake pipe 24 and which reduces or increases the air pressure in the brake pipe. The pneumatic signals are mainly sensed by the car control device 16 to apply the necessary braking functions. In this embodiment, the power to the car control device is provided by a suitable local power generator, such as an axle generator, a solar power generator, a pneumatic rotary generator, a vibration generator, suitable batteries, or any other suitable type of generating equipment that can supply the necessary electrical power to drive the car control device 16. In the emulation mode, the combination car control device and control valve electronically simulates the function of the strictly pneumatic conventional braking system. Pressure transducers are provided to continually sense the brake pipe pressure for applying or releasing the brake cylinder, as will be more clearly described below. The pressure transducers enhance the speed of recognizing change of rate and reduction of the brake pipe pressure. Also, as above mentioned, the advantage of being able to utilize this mode of operation is especially valuable in the transitional period where the cars are being changed over and retrofitted from conventional pneumatic systems to ECP systems. Under those circumstances, the car owners are allowed to operate the trains conventionally until the entire fleet of cars is retrofitted with ECP brakes. Moreover, the emulation mode will actually perform better than the purely pneumatic conventional valve which it is emulating by particularly using air more efficiently in logic operations. The braking system of the present invention is more sensitive in the emulation mode in recognizing pressure changes through the pressure transducers which accelerate initial quick service and accelerate release functions.

Figure 3:
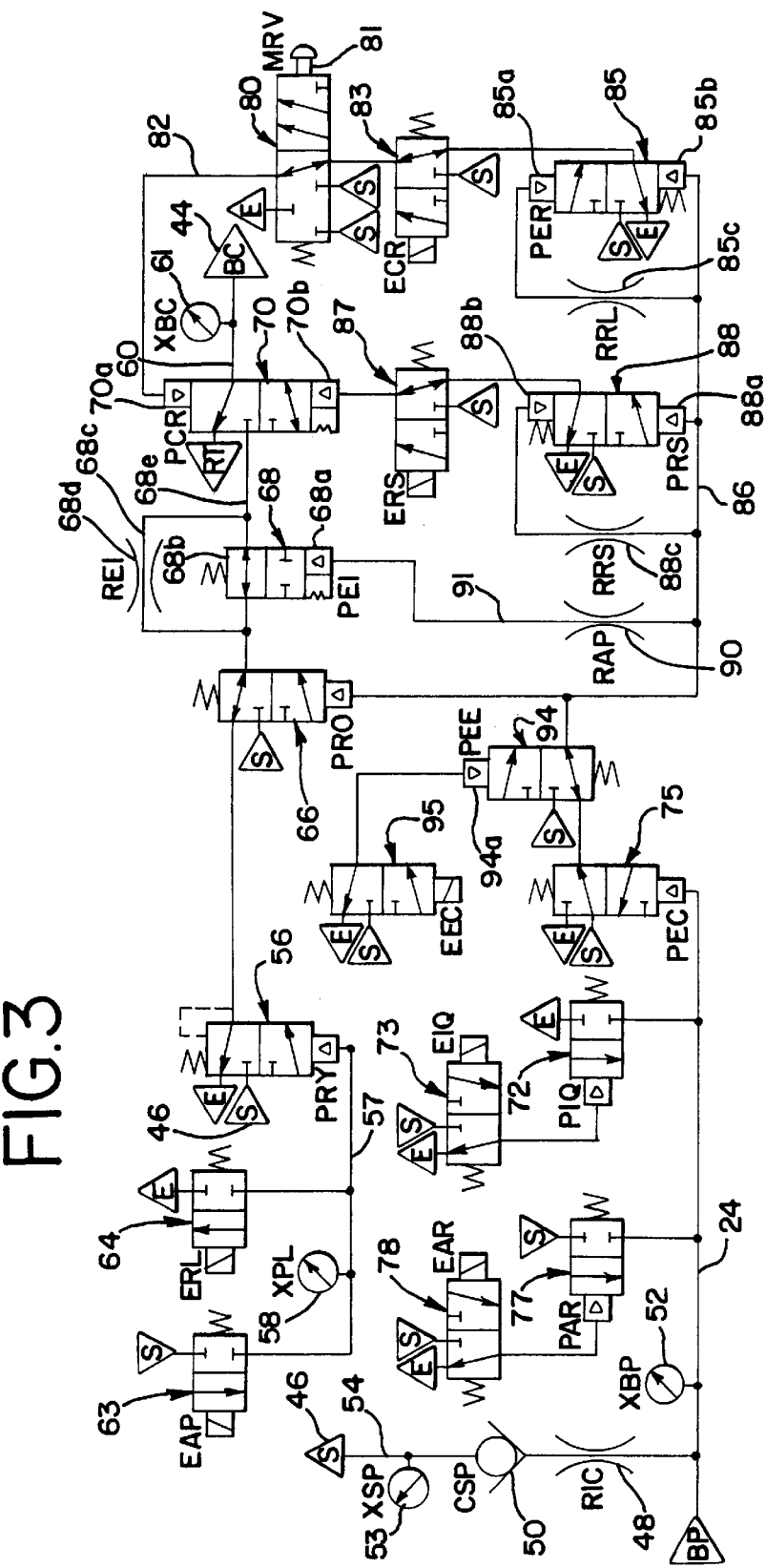
FIG. 3 is a schematic view of the pneumatic circuitry of the control valve assembly of the present invention using conventional ANSI symbols.

The car control valve assembly 15 is shown in detail in FIG. 3 and which includes a plurality of valves for controlling the air flow to operate the brake cylinder 44 under all conditions. Although only one brake cylinder is shown and referred to herein, it will be understood that the valve assembly would operate all brake cylinders on the car. As above mentioned, the valve assembly is connected to the brake pipe which supplies pressure to the supply reservoir and also in the emulation mode serves to transmit pneumatic commands or signals to the valve assembly. All valves in the assembly may be two-position/three-way solenoid operated, two-position/five-way pneumatically operated, or any other type of electronic pneumatic or pneumatic valve that will provide the desired air flow control for operating the system. As shown in FIG. 3, some valves are detented to latch in one of two positions.

Also, as above mentioned, the control valve assembly can continue to maintain the operation of the conventional retainer valve and is connected to the retainer valve which has long been known and been used on freight cars, primarily for the purpose of providing some braking when negotiating grades and to produce a retarded release. It is well known that a retainer valve includes three positions. The first position and the normal position is the exhaust position where all brake cylinder pressure may be exhausted. The second position is called a high-pressure position, which is used to always retain a certain pressure value on the brake cylinders and particularly is used when the train would be going downgrade and there would be a desire to slow up the particular car on which the valve is actuated. The third position is called slow-direct, which allows a gradual release of cylinder pressure until it reaches zero. As above noted, the retainer valve is normally set in the exhaust position which allows exhausting of brake cylinder pressure in accordance with the operation of the control valve assembly during emulation.

It should further be appreciated that the present invention operating in the ECP mode need not use the retainer valve as the braking can be entirely controlled electronically at all times.

While referencing the various valves, pressure transducers, and elements will be made with numerical legends, for additional clarity letter designations are also provided in accordance with the following chart:

| Pipe | Pipe Connection To Pipe Bracket |
| --- | --- |
| BC | Brake Cylinder |
| BP | Brake Pipe |
| E | Exhaust |
| RT | Retainer Valve |
| S or SP | Supply (combined emergency and auxiliary and optionally the quick action chamber) |
| Valve | Valve Port |
| S or SP | Supply |
| E | Exhaust |
| Acronym | Name |
| CSP | Supply Check Valve |
| CRAP | Combined Restrictor Application Orifice |
| DPPRY | Dual Pilot Pneumatic Relay Valve |
| EAP | Electronic Application Valve |
| EAR | Electronic Accelerated Release Valve |
| ECR | Electronic Cylinder Release Valve |
| EEC | Electronic Emergency Charge Valve |
| EEO | Electronic Emergency Override Valve |
| EIQ | Electronic Initial Quick Service Valve |
| ERL | Electronic Release Valve |
| ERS | Electronic Reset Valve |
| MRV | Manual Release Valve |
| PAR | Pneumatic Accelerated Release Valve |
| PCR | Pneumatic Brake Cylinder Release Valve |
| PEC | Pneumatic Emergency Charge (backup) Valve |
| PEE | Pneumatic Electronic Emergency Charge Valve |
| PEI | Pneumatic Emergency Inshot Valve |
| PER | Pneumatic Emergency Release Valve |
| PIO | Pneumatic Inshot Override Valve |
| PIQ | Pneumatic Initial Quick Service Valve |
| PLA | Pneumatic Latching Apply Valve |
| PLM | Pneumatic Latching Master Valve |
| PLR | Pneumatic Latching Release Valve |
| PRO | Pneumatic Relay Override Valve |
| PRS | Pneumatic Reset Valve |
| PRY | Pneumatic Relay Valve |
| RAP | Restrictor Application Orifice |
| REI | Restrictor Emergency Inshot Orifice |
| RIC | Restrictor Initial Charging Orifice |
| RRL | Restrictor Emergency Release Orifice |
| RRS | Restrictor Reset Orifice |
| XBC | Brake Cylinder Transducer |
| XBP | Brake Pipe Transducer |
| XPL | Pilot Line Transducer |
| XSP | Supply Reservoir Transducer |

The brake pipe 24, through its pressure, normally supplies and maintains the supply reservoir 46 at the same pressure. When the system is initially charging, brake pipe pressure is delivered to the supply 46 through line 47 in which is located a restrictor initial charging orifice 48 and a check valve 50 which only allows air flow in one direction into the supply reservoir. Once the supply reservoir is fully charged, the valve assembly can thereafter function to apply braking operations. On a continuing basis the brake pipe will maintain the supply reservoir at the same pressure as the brake pipe unless the brake pipe pressure falls below the supply reservoir pressure.

The functions of the emulation mode of the valve assembly of the present invention includes brake controller functions, communication functions, direct operator functions, and miscellaneous brake functions.

The brake controller functions concern the control of air pressure on the brake cylinders and particularly the application and releasing of that pressure. This activity may be either normal service operation or emergency operation. More specifically, the functions include service release, service application, emergency application, emergency release, pneumatic emergency application, and pneumatic emergency release. Normal or standard service application operations include the application of brakes for scheduled stops or the slowing of the train on downgrades. Likewise, normal service release operations include the release of the brakes to enable the train to start after a scheduled stop or to freely release the brakes following the completion of travel along a downgrade. Emergency application operations will take place when a threatening situation confronts the train and requires an unscheduled stop or when a car or series of cars may be disconnected from the locomotive to expose the brake pipe to atmosphere.

Direct operator functions result from the input or operation of a trainman locally at a car for particular control of a car. These functions include operation of a manual release valve for release of brake cylinder air, release of the supply reservoir pressure, or reapplication of the brake cylinder pressure, and operation of the retainer valve setting. The brake cylinder release function is useful particularly when conducting maintenance on brake shoes on a parked railcar wherein manual operation of a lever or button releases the pressure in the brake cylinder to atmosphere after the brake cylinder pressure has first been applied. The brake cylinder reapply function instructs the brakes to apply after the brakes had been manually released by the cylinder release function. The supply release function permits the operator to completely deplete the pressure contained in the supply reservoir and is most typically utilized when removing and maintaining the whole brake system as above mentioned. The retainer valve setting is used to select different brake cylinder operating pressures. For example, when going downgrade, the brakes can be set to keep the brakes constantly applied at a certain level even when the brake pipe pressure commands or electronic commands instruct to fully release the brakes.

The communications functions enable the brake systems on different cars to successfully interact and include accelerated emergency release function, accelerated service release function, and initial quick service or braking function. The initial quick service function accelerates the propagation of the brake application signal through the brake pipe. By exhausting brake pipe pressure locally at each brake system, the time required for subsequent brake systems to recognize the drop in pressure from the front end of the brake pipe is reduced. Similarly, the accelerated brake release function assists in propagating pneumatic signals to other cars by dumping air locally from the supply reservoir into the brake pipe. This enables the buildup of pressure in the brake pipe to come about more quickly, and accelerates the time required for subsequent brakes or downtrain cars to recognize the release signal in the brake pipe. The accelerated service release function accelerates the release of a service application.

The miscellaneous brake functions include electronic reset of the cylinder release valve, the brake cylinder inshot function, the supply charging function and the accelerated charging function. The electronic reset function overrides the cylinder release function when the brakes receive instructions that it is active. The brake cylinder inshot function is utilized during pneumatic emergencies to accelerate the initial brake application as the brake cylinder extends under constant pressure to a minimum application level. The supply charging function allows slow charging of the entire supply reservoir chamber of each car from which the braking system draws air volume to apply air pressure to the brake cylinder so that the reservoirs in all cars can charge at substantially the same level.

It will be understood that the position of the valves in FIG. 3 and FIGS. 7 to 16 are before any operation of the braking system takes place and prior to charging of the supply reservoir. The electronic pilot valves move from the normal position to the actuated position when the solenoid of that valve is energized in accordance with an electronic signal from the car control device and serve to pilot the operation of related pneumatic valves which produce braking functions. The strictly pneumatic valves respond to pneumatic pressures. Most of the electronic and pneumatic valves, when not actuated, are driven to their home or normal position by return springs. The electronic valves have ports connected to the supply reservoir and/or atmospheric exhaust. As earlier mentioned, all exhaust air from the brake cylinder goes through the retainer valve while the exhaust of other valves goes to atmosphere.

Figure 4:
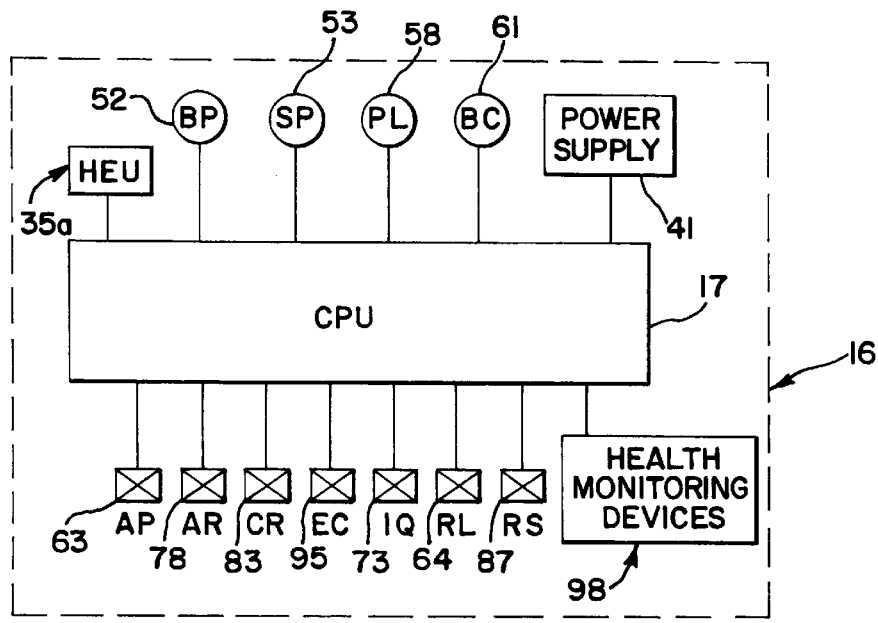
FIG. 4 is a block diagram of a car control device of the present invention.

The brake system pneumatic circuitry, as shown in FIG. 3, is tied into the car control device 16 for monitoring pressures at the brake cylinder, the brake pipe, the supply reservoir or supply, and the pilot line to the relay valve. Accordingly, the brake pipe pressure transducer, designated as 52, is connected to the brake pipe line 24, as seen in FIG. 3, for the purpose of providing an electronic signal proportional to the brake pipe pressure to the car control device computer 17, as illustrated in FIG. 4. A transducer 53 is connected to the supply line 54 to monitor the pressure in the supply reservoir 46 and to produce an electronic signal for transmission to the car control device computer 17.

A pneumatically operated relay valve 56, which generally controls the pressure in the brake cylinder, responds to the pressure in pilot line 57. Valve 56 is maintained in its normal or null position by a return spring and pressures in the pilot line 57 and the brake cylinder line 60, and will be actuated to connect the brake cylinder line 60 to atmospheric exhaust or to supply when the pressure in pilot line 57 is different from the downstream pressure or pressure in the brake cylinder line. A pilot line pressure transducer 58 monitors the pressure in the pilot line 57 and converts it into an electrical signal for the car control device computer 17.

The fourth pressure transducer is connected to the brake cylinder line 60 and is designated as 61 for monitoring the pressure in the brake cylinder 44. The pressure transducer 61 produces an electrical signal for the car control device computer 17 to register the brake cylinder pressure in the computer.

For operation of the pneumatic valve during regular application and release functions of the brake cylinder, a solenoid operated application valve 63 and a solenoid actuated release valve 64 serve to operate the pneumatic relay valve 56.

BRAKE CONTROLLER FUNCTIONS

Service Application Function

When the car control device 16 senses a sufficient rate change through the brake pipe pressure transducer 52, during the emulation mode, the car control device recognizes that the locomotive engineer has sent a pneumatic application signal through the brake pipe. The car control device then calculates the appropriate target brake cylinder pressure based upon the difference between the maximum brake pipe pressure and the current brake pipe pressure; and sends a series of pulsing signals to the solenoid actuated application valve 63 to increase the brake cylinder pressure until the target pressure is achieved. By sending these pulsing signals, the rate of increase in the brake cylinder pressure is controlled. Also, when the pulsing signals are sent to the application valve 63, those signals will go through the pilot line 57 and be sensed by the pneumatic relay valve 56, which then connects the supply reservoir to the brake cylinder through the pneumatic relay override valve 66, the pneumatic emergency inshot valve 68 and the pneumatic cylinder release valve 70 which will have been shuttled or reset to connect the brake cylinder line 60 to the line 68a coming from the inshot valve 68. Valve 68 is merely detented for snap action, while valve 70 is detented for latching in one of two positions. Once air fills the brake cylinder, valve 56 moves to the center to cut off further communication with the supply. When the pressure in valve 56 is balanced between that in the pilot line 57 and the brake cylinder line 60 and the spring, valve 56 is not connected to the supply or exhaust. Likewise, in the ECP mode, electronic signals to the car control device can set the braking at any time to whatever level desired by controlling the actuation of the application valve 63.

Service Release Function

In the emulation mode, when the car control device 16 senses that the pressure in the brake pipe has increased sufficiently after a service application function which causes braking, the car control device pulse width modulates the solenoid actuated release valve 64 to obtain the rate and pressure desired until the brake cylinder pressure has been depleted. In the actuated position, the release valve 64 connects the pilot line 57 of the relay valve to atmospheric exhaust, thereby exhausting the air in the pilot line which then allows the return spring force of the pneumatic relay valve 56 to return the valve to the position, as shown in FIG. 3, which connects the brake cylinder line 60 to exhaust through a pneumatic relay override valve 66, pneumatic emergency inshot valve 68, and the pneumatic cylinder release valve 70 when valve 70 is shuttled to connect line 60 to the inshot line 68e. While the pressure in pilot line 57 will be dumped by the release valve 64 to shuttle the relay valve and connect the brake line to exhaust, preferably the air in the brake cylinder is released upon shuttling the cylinder release valve 70 to connect the brake cylinder line 60 to the retainer valve port RT.

The ports of the valves designated E go to atmosphere, while the port RT on valve 70 is connected to the retainer valve. It will be appreciated that the service release function will take place following a service application function and begin operating once the brake pipe pressure increases a predetermined amount above the minimum brake pipe pressure sensed during the service application. For example, when the brake pipe pressure increases a predetermined amount above the minimum brake pipe pressure sensed during service application, the service release function will begin. As above set forth, the pneumatic cylinder release valve 70 will be shuttled to the position shown in FIG. 3 when the release function begins to exhaust the brake cylinder air through the retainer valve. This may be done by actuating the electronic cylinder release valve 83. The brake cylinder pressure will be depleted to 0 psi when the retainer valve is set in the exhaust position.

In the ECP mode, the signals to the car control device are sent electronically to control the release function, as well as the degree of braking by controlling the release valve 64. Also, in this mode, the brake cylinder is exhausted through the relay valve, while the brake cylinder is exhausted through the retainer valve in the emulation mode. However, the car control device may be optionally programmed to cause the cylinder release valve 70 to exhaust the brake cylinder air through the retainer valve during the ECP mode.

Emergency Application Function

In the emulation mode, when the car control device senses a sufficient negative rate change value through the brake pipe pressure transducer 52, and which of course would be greater than the service application rate, the car control device recognizes that the locomotive engineer is now sending a pneumatic emergency application signal through the brake pipe or that there is a break in the brake pipe line and that an emergency application function should be commenced. The brakes are applied and then the car control device suspends all other operations for a specified period of time in order to assure that the entire train has come to a complete stop. This period also prevents the locomotive engineer from releasing from the emergency application position prior to propagation of the emergency application signal to the entire train. If the emergency time has expired, then there can be an occurrence of the emergency release. The car control device will sense the pneumatic command in the brake pipe through the pressure transducer 52, and energize the solenoid actuated electronic emergency valve 95 to drive the pneumatic emergency valve 94 to connect the emergency pilot line 86 to supply to be charged. Then pneumatic override valve 66 will be shifted to cut off the relay valve 56 and connect the supply directly to the brake cylinder line 60. Simultaneously, upon charging the pilot line 86, the pneumatic reset valve 88 will be shifted to connect the supply to the end 70b of the release valve 70 to reset valve 70 to connect the brake cylinder line 60 to the inshot valve 68 if no reset signal has been previously sent to the electronic reset valve 86. In this respect, the pneumatic reset valve 88 is a backup to the electronic reset valve 83 if the car control device has no power. During the initial stage of the emergency function, air flow is provided through the inshot valve 68 and the bypass line 68c. Once the choke or restrictor 90 allows pressure buildup at 68a, the inshot valve is shifted to cut off flow through the valve, but still allows air flow through the bypass line for an emergency application rate.

Although shown separately in FIG. 3, the chokes 90, 88b and 85c could be consolidated as a single choke off the emergency pilot line 86.

In order to propagate the pneumatic command signal for brake application to other cars in the train having only automatic pneumatic braking systems, a pneumatic initial quick service valve 72 operable by the solenoid actuated initial quick service valve 73 functions to connect the brake pipe to exhaust. When the CCD produces a signal to actuate the solenoid pilot valve 73, it will connect the actuating end of the pneumatic initial quick service valve 72 to supply to shift the valve 73 and connect the brake pipe 24 to exhaust. During an emergency situation the CCD will start a countdown timer initialized with a count in seconds equal to the pressure of the brake pipe max brake pressure before the emergency was initiated.

In the ECP mode, all emergency braking operations may be controlled by the relay valve 56, as the car control device will make the calculations necessary to operate the brake cylinder and, accordingly, actuate the solenoid application valve 63 or the solenoid release valve 64.

Emergency Release Function

In the emulation mode, when the car control device senses the brake pipe pressure transducer signal which has increased higher than the required amount for normal application, and sufficient time has elapsed from the emergency application event, the car control device recognizes first through the brake pipe pressure transducer 52 when power is on that the locomotive engineer is sending an emergency release signal through the brake pipe. At that time the car control device calculates the target brake cylinder pressure based on the maximum brake pressure experienced prior to the emergency application. The target pressure is substantially equivalent to a typical full service application. Then the car control device sends a signal to the solenoid actuated cylinder release valve 83 to drive the cylinder release valve 70 for exhausting air in the brake cylinder line until the target brake cylinder pressure is achieved. This operation essentially releases the brake from an emergency braking condition so that it can return to a typical full service braking condition that would correspond to the maximum brake pipe pressure before the emergency was initiated.

In ECP mode, all emergency release functions may be controlled through the relay valve by operation of the electronic release valve 64.

Pneumatic Emergency Application Function

The pneumatic emergency application function provides a fail-safe backup system to function during system or operation failure if the car control device loses power by way of damage or lack of power, or there is a break in the train (train breaks in two). The brake system of the invention must still recognize emergency application conditions when the electronics of the system fails, as above described. These conditions may also be useful to assure that cars remain stopped when they are stored in a rail yard without locomotive control. When the brake pipe pressure falls below a predetermined level regardless of the reduction rate, pressure in the brake cylinder is put at maximum given the current supply reservoir conditions. The pneumatic emergency charge valve 75, which initially charges the emergency pilot line 86, takes the position shown in FIG. 3, causing the pneumatic reset valve 88 to pulse "on" and connect the supply to the lower side of 70b of the pneumatic cylinder release valve to shift it so as to disconnect the brake cylinder line 60 from the exhaust through the retainer valve and reconnect it back to the supply line coming from the override valve 66. Substantially simultaneously with the pulsing of the reset valve 88, the pneumatic relay override valve 66 is shifted which connects the supply reservoir directly to the brake cylinder line 60 through the inshot valve 68 and the cylinder release valve 70. A choke or restrictor 88c allows enough air to feed into the line to 88b, and when the air pressure in the line to 88b equals the air pressure at 88a, then the pressure at 88b plus the return spring will cause shifting of the reset valve to the position shown in the drawings, and thereby cut off the connection between the supply line from valve 88 and end 70b of the cylinder release valve 70.

Pneumatic Emergency Release Function

The brake cylinder pressure can also be released by the pneumatic emergency release valve 85. When the pressure in the pneumatic emergency pilot line 86 is dumped, the pressure at 85a when delayed by choke 85c overcomes the pressure at 85b and the return spring to pulse the valve to connect the supply to end 70a of the solenoid release valve 70 and drive valve 70 to exhaust the pressure in the brake cylinder line 60 through the retainer valve. Otherwise, when the pressure in the pilot line 86 is present, the emergency release valve 85 holds its position as shown in the drawing. It should be noted the pneumatic cylinder release valve 70 is a detent valve in order to provide a sharp cutoff and hold the valve in whichever position it takes based upon the pressure values at opposite ends of the valve. As above mentioned, any time it is desired to reset the pneumatic cylinder release valve for brake application, the electronic reset valve 87 may be actuated to connect the supply pressure to the lower end 70b of the valve and cause it to take the position shown in the drawing. Thereafter, the reset valve 87 returns to the position shown in the drawing to remove the pressure from the lower end of the cylinder release valve 70.

COMMUNICATIONS FUNCTIONS

Accelerated Service Release Function

In the emulation mode, when the car control device first recognizes a sufficient increase in brake pipe pressure from the brake pipe pressure transducer 52 for the purpose of releasing the brake cylinder from a service application, an accelerated service release communication function is initiated by the pneumatic accelerated release valve 77 as controlled by the electronic solenoid operated pilot accelerated release valve 78 so as to initiate the accelerated service release communication function. Actuation of the electronic accelerated release valve 78 shuttles the pneumatic accelerated release valve 77 to dump the supply air into the brake pipe 24, thereby propagating the release signal to the brake pipe for other cars in the train. Because of the extremely large volume of air in the brake pipe present in a full train, it may take an unreasonable amount of time for the cars near the rear of the train to recognize that the brake pipe pressure is increasing. To assist in accelerating the signal to the cars in the rear, when each brake recognizes a brake pipe pressure increase after an application, it assists the increase by dumping any available air from the local supply reservoir to the brake pipe. This accelerates the propagation of the service release function to the rear of the train.

The accelerated service release valves are not employed in the ECP mode as all cars would receive the electronic release signal from the HEU at the same time.

Accelerated Emergency Release Function

When in the emulation mode, the accelerated emergency release function is similar in all respects to the accelerated service release function with the exception that it occurs only after an emergency application. In the ECP mode, this function is not applicable.

Initial Quick Service Function

In the emulation mode, the initial quick service communication function is initiated when the car control device first recognizes a sufficient decrease in the brake pipe pressure through the brake pipe pressure transducer to commence the brake cylinder operation. As above mentioned, because of the extremely large volume of air in the brake pipe existing in a full train, it may take an unreasonable amount of time for the cars near the rear of the train to recognize that the brake pipe pressure is decreasing. This is particularly critical because of the danger of train run-in where cars will run together because of slow braking. This is a phenomena that occurs due to the fact that the cars towards the front of the train start applying brake cylinder pressure prior to the cars in the rear because they sense the brake pipe pressure reduction ordered by the engineer more immediately. Accordingly, when there is a full train of cars with millions of tons of loading, the force from the freely moving cars in the rear into the retarded cars toward the front of the train can result in dangerous situations such as buckling of the train or even a derailment. In order to prevent this situation, the application signal is accelerated to the rear of the train by releasing brake pipe pressure locally at each brake system. Thus, the application signal is propagated throughout the brake pipe by further exhausting brake pipe pressure through the pneumatic initial quick service valve 72 as actuated by the solenoid operated pilot valve 73, which will pulse the pneumatic valve 72. Again, in the ECP mode, this quick service function is not used.

DIRECT OPERATOR FUNCTIONS

Brake Cylinder Release Function

These functions require the input or operation of a trainman locally on or near the brake of a car. When it becomes necessary to perform maintenance on the brake shoes, the car is generally spotted in a service yard where the brake shoes may be applied. Before the brake shoes can be removed from the brake rigging, the brake cylinder must be released. Until given a condition where the brakes are applied, a manual release valve 80 having a release stem or plunger 81 is provided on the service side of the pipe bracket and may be depressed against the force of the return spring to actuate the valve. Normally a lever would be located on the side of the car and connected through a series of mechanisms when operated to ultimately depress a spring-loaded momentary actuator on the release valve 80. A short actuation of this valve releases the pressure in the brake cylinder and allows the operator to perform any necessary maintenance. Actuation of the manual release valve by momentarily actuating a lever to operate the button 81, for a sufficient duration, causes the supply to be connected to the end 70a of the cylinder release valve 70 to shuttle the valve and connect the brake cylinder to exhaust through the retainer valve.

Supply Release Function

When it becomes time to perform maintenance on the entire brake control system, all the pressure in the system must be released. This operation is performed by the operator utilizing the same lever used in the brake cylinder release function above mentioned. A momentary actuation of the valve releases the brake cylinder. However, if the valve is held open, the supply reservoir air is also released to atmosphere during this time. The manual release valve 80, when momentarily depressed, not only connects the supply through the electronic cylinder release valve 83 to the pneumatic cylinder release valve to operate it to cause the brake cylinder to exhaust its air through the retainer valve or otherwise to atmosphere, but also the supply is connected directly to exhaust so that the air in the supply reservoir can also be completely exhausted. As long as the manual release button is pressed, the supply pressure in the supply reservoir will be released to atmosphere.

Brake Cylinder Re-Apply Function

Where only maintenance has been performed on the brake shoes as under the brake cylinder release function, the maintenance person will need to check the seat of the cylinder, the rigging, and the operation of the brake shoe. A button is provided to cause energization of the electronic reset valve 87 which resets the cylinder release valve to reconnect the brake cylinder with the pressurized brake cylinder line 60 and cause reactuation of the brakes by pressurizing the brake cylinder 44. Thus, the operator can depress the brake cylinder re-apply button after the brake cylinder release function has been provided. This allows the operator to re-apply the brakes and evaluate the brake cylinder, the rigging, and the shoe interaction with the wheels.

MISCELLANEOUS BRAKE FUNCTIONS

In addition to being able to release the pressure in the brake cylinder when a car is parked by use of the manual release valve 80, the pneumatic cylinder release valve 70 can be shifted by operation of the electronic cylinder release valve 83 to drive the valve 70 to the position shown in FIG. 3. Actuation of valve 83 causes the supply pressure to be connected to the backside 70a of the pneumatic cylinder release valve 70 to shuttle the valve and connect the brake cylinder line 60 to the exhaust of the retainer valve.

The inshot valve 68 is shown in the high-flow state and when it is shuttled to its other position after the pressure at 68a overcomes the pressure at 68b of the return spring, the flow through the valve will be cut off, but a reduced flow will go through the bypass line 68c that is restricted by the restrictor orifice or choke 68d. The size of the restrictor orifice defines the delay before the inshot valve 68 is shifted. Thus, the inshot rate will allow flow through both paths, the path through the valve and the bypass line for emergency situations to the inshot outlet line 68e. The inshot valve 68 minimizes the time to extend the brake cylinder. This decreases the reaction time of the brake cylinder from the initial activation.

To further improve performance of the pneumatic circuitry, a solenoid actuated pneumatic emergency charge valve 95 is provided. Upon actuation of the solenoid actuated emergency charge valve 95 supply pressure is applied to the end 94a of the pneumatic emergency charge valve 94 to shuttle the valve and connect the supply pressure directly to the pneumatic emergency pilot line 86. The pressure at 94a overcomes the return spring for shuttling the valve. While the emergency charge valve is not absolutely necessary in the pneumatic circuit, it improves the performance in the braking system. Thus, the pneumatic charge valve 94 accelerates the charging of the system in pneumatic emergencies.

SUMMARY OF VALVE FUNCTIONS

The solenoid actuated valves 63 and 64 in either the emulation or ECP mode respectively drive the pneumatic relay valve 56 by applying air to the pilot line 57 to charge the brake cylinder for brake application operations and for releasing air from the pilot line 57 to exhaust the brake cylinder air for brake release operations in the ECP mode and to otherwise vent the air from line 57 for a further brake application function. As above mentioned, these operations will be possible when the valve 70 is shuttled to connect the brake cylinder line 60 to the inshot line 68e. Further, in the emulation mode the valve 70 will be shuttled to connect the brake cylinder to the retainer valve during the brake release functions. Thus, the pneumatic relay valve 56 responds to either the solenoid actuated application valve 63 or the solenoid actuated release valve 64 in operating the brake cylinder 44 during normally scheduled braking operations by piloting the actuation of relay valve 56 and when power is available to the car control device. Moreover, once the brake cylinder is filled with air to the desired braking level, valve 56 centers to cut off further communication with the supply. Thus, when the pressure in valve 56 is balanced between the pressure in the pilot line 57 and the pressure in the brake cylinder line 60 plus the return spring, the spool in valve 56 goes to a null position where neither the supply nor the exhaust is connected to the brake cylinder line, as above explained.

The solenoid actuated initial quick service valve 73, when electronically actuated, pilots the operation of the pneumatic quick service valve 72 to dump brake pipe pressure to atmosphere and propagate the braking application signal down the train.

The solenoid actuated release valve 78 pilots the pneumatic accelerated release valve 77 to connect the supply air to the brake pipe 24 and propagate a pneumatic release signal to the other cars down train by dumping supply air into the brake pipe.

The solenoid operated emergency charge valve 95 pilots the pneumatic emergency charge valve 94 to charge the pneumatic emergency pilot line 86 in the emergency circuit when a pneumatic emergency situation is detected. Charging pilot line 86 immediately shifts the pneumatic relay override valve 66 to cut off relay valve 56 and connect the supply to the brake cylinder through the inshot valve 68 and bypass line 68c around the inshot valve to provide the maximum emergency charging of the brake cylinder for braking operations. Simultaneously, the pneumatic reset valve 88 is shuttled to assure the cylinder release valve is positioned to connect the brake cylinder line 60 to the inshot line 68e.

For example, when brake pipe pressure is at the normal 90 psi level, the pneumatic backup emergency charge valve 75 will be shuttled to connect the pilot line 86 through the electronically actuated pneumatic emergency valve 94 to atmospheric exhaust to set up the condition for emergency charging of the pilot line 86 which can take place upon an electronic signal going to valve 95 that pilots operation of the emergency charge valve 94 to connect the supply to the pilot line 86.

In the event that electronic power has been lost, thereby disabling the car control device 16, which would prevent operation of the electronic emergency charge valve 95 to shuttle the pneumatic electronic emergency charge valve 94 for connecting supply air to the emergency pilot line 86, and when the brake pipe pressure drops to a predetermined set pressure, the pneumatic backup valve 75 will shuttle to connect the supply air to the pilot line 86 for effecting an emergency braking operation. It will be appreciated that in the emulation mode an electronic signal for an emergency braking operation will provide a much quicker emergency braking operation because when the control device senses a drop in brake pressure of a predetermined rate, it will signal the electronic emergency charge valve 95 to cause the pneumatic emergency charge valve 94 to shuttle and charge the pilot line 86. However, the pneumatic backup valve 75 will wait until the brake pipe pressure has dropped to a predetermined set pressure before operating to charge the emergency circuit pilot line 86.

Following an emergency braking signal and the charging of line 86, after the pressure beyond the chokes 90 and 85c has increased sufficiently, the inshot valve 68 will close to shut off flow through the inshot valve but still allowing flow through the bypass line 68c.

Moreover, the pneumatically operated cylinder release valve 70 will function to exhaust the air pressure in the brake cylinder in response to a command from a trainman operating electronic cylinder release valve 83 which shuttles valve 70 to connect the brake cylinder to exhaust through the retainer valve. Further, the cylinder release valve may be operated to release the air pressure in the brake cylinder by operation of the manual release valve 80 by momentarily actuating valve 80. As already mentioned, the cylinder release valve 70 is connected to the retainer valve such that exhaust of air from the brake cylinder through release valve 70 will go through the retainer valve. While a conventional release stem valve may be used, the valve 80 is additionally useful to completely deplete the supply reservoir by causing the stem 81 to connect the supply to atmospheric exhaust until depletion is completed.

The cylinder release valve 70 may be reset for normal braking operations by the electronic reset valve 87. It may also be reset for normal braking operations in the event that it has been shuttled to exhaust the air pressure from the brake cylinder by the pneumatic reset valve 88 which shuttles upon a charging of the emergency pilot line 86 after choke 88c allows a pressure buildup and the pilot line pressure goes to end 70b of valve 70.

When operating the pneumatic brake system as an electronically controlled system, the braking operations are directly controlled by the various solenoid actuated pilot valves in response to electronic commands made from the locomotive to the car control device either through a train line or through wireless communication. The braking operations are also controlled by the solenoid valves in the emulation mode in response to signals from the pressure transducers.

Accordingly, it is appreciated that the brake system of the present invention may be operated in the ECP mode or in the emulation mode so as to be workable with trains that additionally have a head end unit or master controller in the locomotive as well as the pneumatic controller. Thus, when the brake system of the invention is being operated in the ECP mode, the brake may be controlled electronically by commands or signals given by the engineer in the locomotive, while when in the emulation mode, the brake is operated in the same manner as the strictly pneumatic conventional system.

It will be appreciated that where a shorter train is made and all cars have the braking system of the invention, when starting the train to charge the air supplies of each car, the pneumatic accelerated release valve 77 may be shuttled by the solenoid pilot valve 78 to effectively bypass the choke 48 and accelerate the charging of the supply reservoirs on the cars. In this respect, the PAR valve 77 is used in reverse.

Moreover, when all cars are equipped with the braking system of the invention, and an HEU on the locomotive operates the systems in the ECP mode, the CPU's of the car control devices send signals to the HEU on the status of the systems as well as receive and respond to signals from the HEU.

Another feature of the car control device is it includes car health monitoring devices 98, as shown in FIG. 4. These devices may include accelerometers mounted on the cars which indicate car movement during a train run, temperature sensors for detecting bearing temperatures of the wheel/axles, car compartments or other car accessories, load sensors for sensing car weights or weight of loads, or other types of sensors. With respect to FIG. 4, it will be understood that the block HEU designated 35a represents an HEU communication port for connection to an HEU of the locomotive.

Figure 7:
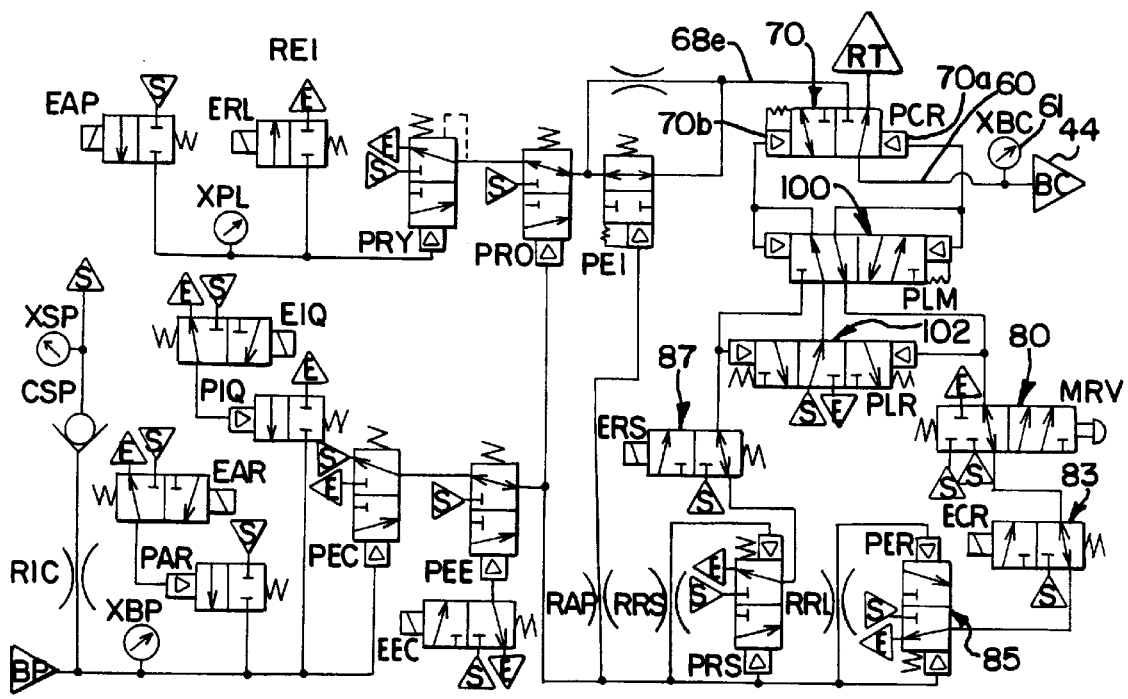
FIG. 7 is a schematic view of the pneumatic circuitry of a modified control valve assembly of the present invention using conventional ANSI symbols and which includes the additional feature of having a pneumatic latching circuit for the pneumatic cylinder release valve.

A modified control valve assembly is shown in FIG. 7 which differs from the control valve assembly in FIG. 3 in that it includes a pneumatic latching circuit for latching the pneumatic brake cylinder release valve 70 in the brake application mode in place of the strictly mechanical latching of the detented release valve.

This pneumatic latching circuit avoids any possible unlatching of the valve due to vibration during transit, as it will be appreciated that premature unlatching would prematurely release the brakes during a braking function.

This pneumatic latching circuit includes a pneumatic latching master valve (PLM) 100 and a pneumatic latching release valve (PLR) 102 interposed between the electronic reset valve 87, the manual release valve 80, and the pneumatic brake cylinder release valve 70. The pneumatic latching master valve 100 may be pulsed by the electronic cylinder release valve 83, the pneumatic emergency release valve 85, or the manual release valve 80 to cause the pneumatic cylinder release valve 70 to pulse and connect the brake cylinder line to the retainer valve for exhausting the brake cylinder. Both the pneumatic latching master valve 100 and the pneumatic latching release valve 102 are shuttled during the regular braking application function to prevent the pneumatic cylinder release valve from delatching because of the pressure applied against the end 70b of the pneumatic cylinder release valve 70. This feature prevents the pneumatic cylinder release valve from shifting while experiencing high shock loads in the axial direction. The air pressure holds the valve in position without relying on the detent of the valve. It will be appreciated that the detented valve latching in addition to pressure latching is optional. However, mechanical latching additionally helps create snap action in the valve when the valve shuttles from one position to the other. Further, the pneumatic latching release valve 102 also functions to apply the pressure at the other end of the pneumatic cylinder release valve to shuttle it into the braking position.

Figure 7A:
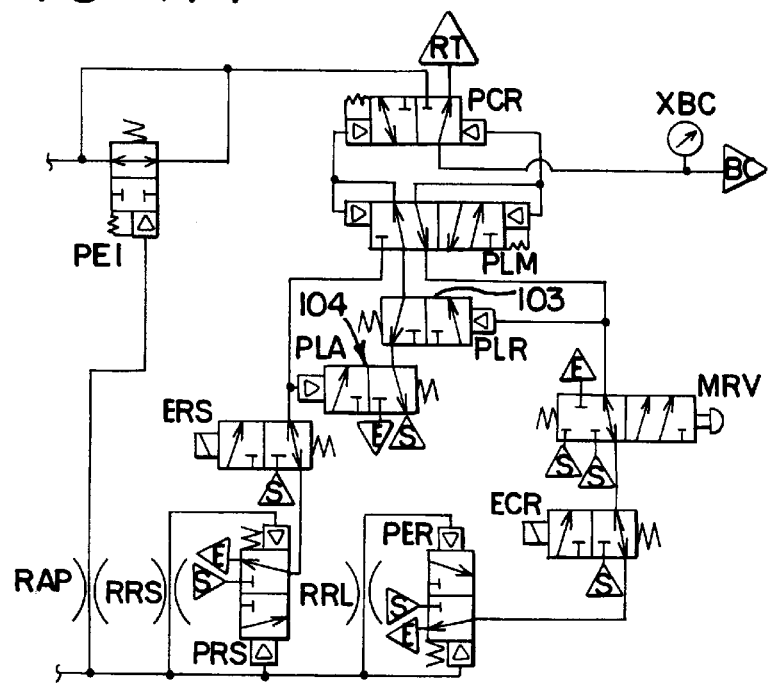
FIG. 7A is a schematic view of a modified pneumatic latching circuit.

The embodiment of FIG. 7A shows a variation of the pressure latching circuitry of FIG. 7 in that the functions of the pneumatic latching release valve 102 are separated between a pneumatic latching relay valve 103 and a pneumatic latching apply or application valve 104. Otherwise, the pressure latching circuit of this embodiment performs the same functions as the pressure latching circuit of the embodiment of FIG. 7.

Figure 8:
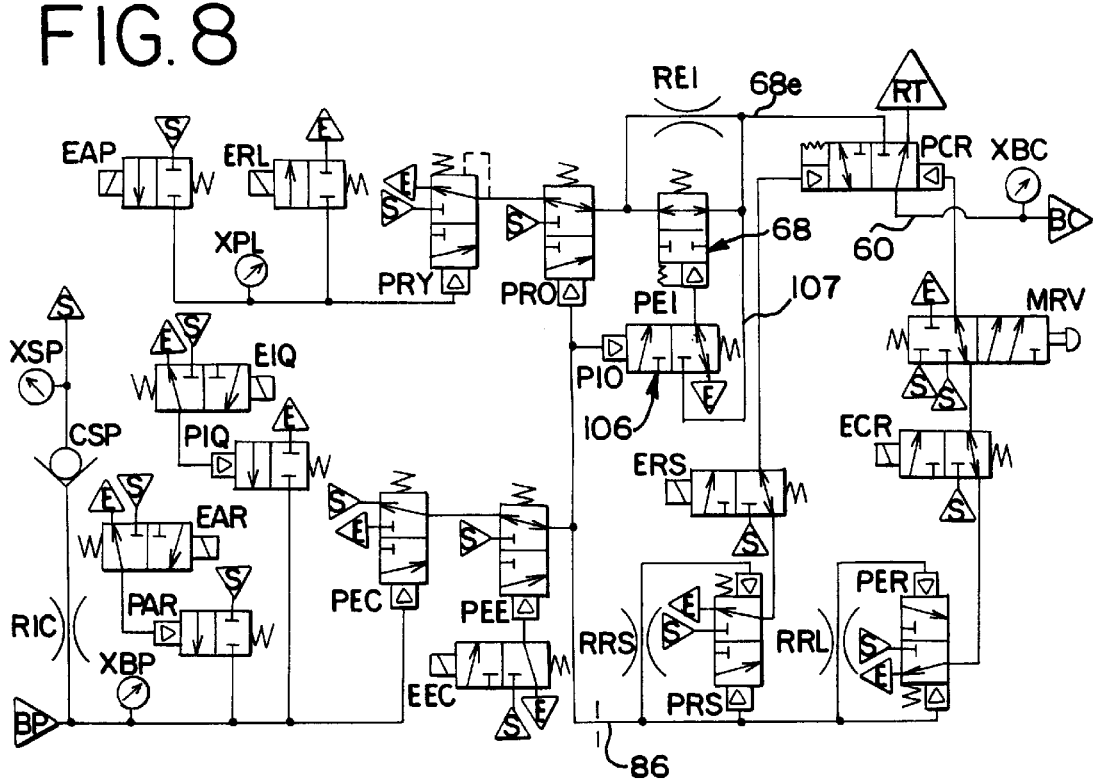
FIG. 8 is a schematic view of the pneumatic circuitry of a still further modified control valve assembly of the present invention using conventional ANSI symbols and which includes a pressure-sensitive inshot circuit instead of the time-sensitive inshot circuit in FIG. 3.

The control valve assembly of FIG. 3 utilizes a time-sensitive inshot circuit by the use of the restrictor application orifice or choke 90. The modification of the inshot valve circuitry is shown in FIG. 8 wherein the inshot is pressure-sensitive. In this embodiment, the pneumatic emergency inshot valve 68 is not connected directly to the pilot pressure line 86 but is connected to a pneumatic inshot override valve (PIO) 106 which responds to the pressure in the emergency pilot line 86 during emergencies to shuttle against the return spring to connect the feedback pressure of the inshot valve. In order to prevent actuation of the inshot valve during service application, the pneumatic inshot override valve 106 is provided. With respect to the return spring value of the valve 106, it must be adequate to accommodate upstream pressure surges without shifting the inshot valve until a predetermined brake cylinder pressure is reached. The pilot side of the override valve 106 is connected to the emergency pilot line 86. This valve will remain in closed position to the feedback line 107 until actuated by the pressure in the emergency line 86. Thus, once the pressure reaches a threshold level in line 86, the override valve is shuttled to connect the brake cylinder pressure in line 68e to shuttle the inshot valve for accelerating the flow of brake air to the brake cylinder. The pressure-sensitive inshot circuit of FIG. 8 lets inshot flow during service applications but allows emergency braking applications upon emergency pressure being in the pilot line 86.

Figure 8A:
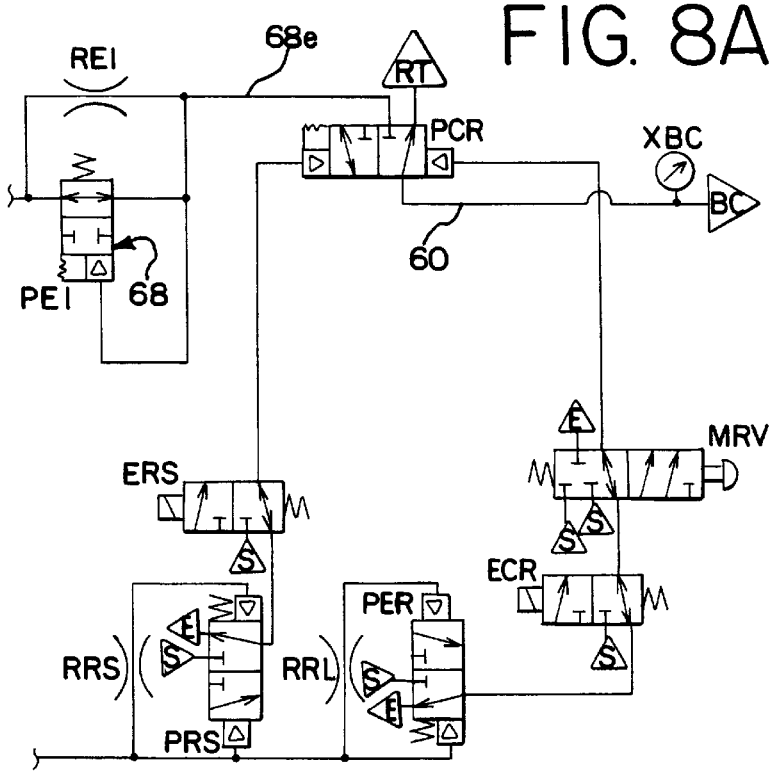
FIG. 8A is a schematic view of a variation of the pressure-sensitive inshot circuit used in the embodiment of FIG. 8.

A variation of the pressure-sensitive inshot circuit is shown in FIG. 8A which allows inshot flow adjustments during both service and emergency applications. This circuit differs from the embodiment of FIG. 8 in that the inshot valve pilot line is always connected to the brake cylinder line 60 through the line 68e and therefore responsive to the brake cylinder pressure during both service and emergency applications.

Figure 9A:
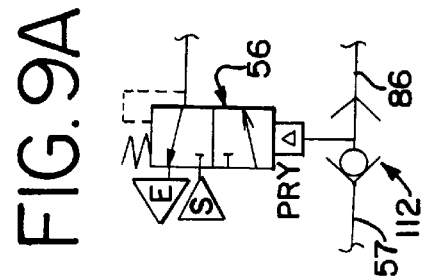
FIG. 9A is a schematic view of a variation of the dual pilot relay valve used in FIG. 9 and which employs a shuttle valve for accomplishing the same functions as a dual piloted relay valve.
Figure 9:
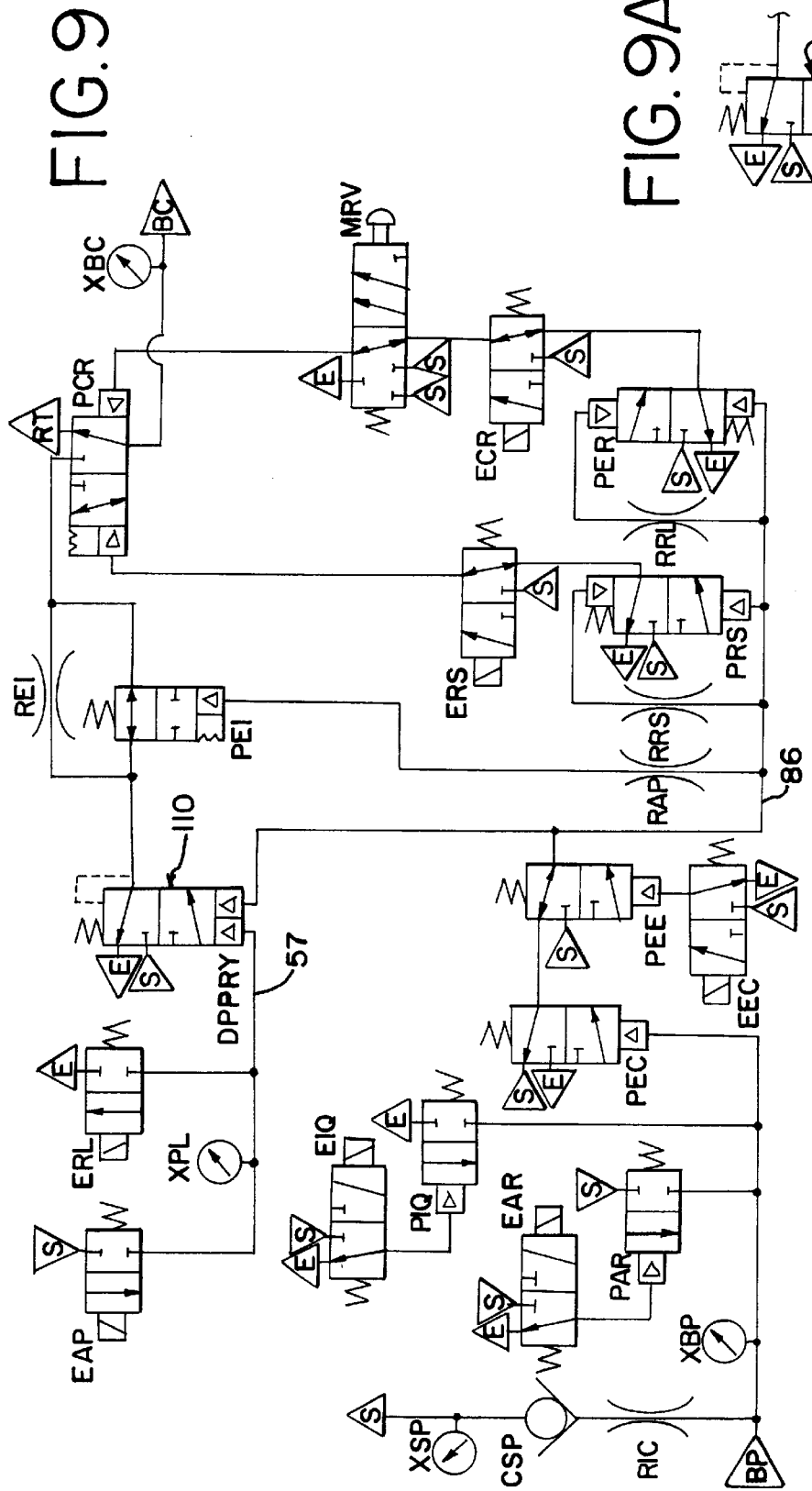
FIG. 9 is a schematic view of the pneumatic circuitry of a further modified control valve assembly of the present invention using conventional ANSI symbols and a dual pilot relay valve employed in place of single piloted relay valve and the pneumatic relay override valve as used in the embodiment of FIG. 3.

Another modification of the control valve assembly of FIG. 3 is shown in FIG. 9 wherein a dual pilot relay valve (DPPRY) 110 is employed in place of the relay valve 56 and the override valve 66 shown in FIG. 1, thereby simplifying the number of components needed in the circuit. The valve 110 incorporates the functionality of the override valve 66 in the embodiment of FIG. 3. This not only reduces costs with respect to the overall valve assembly but also reduces the need for space on the manifold and it simplifies the pneumatic circuitry. Thus, the dual piloted valve is not only responsive to the pilot pressure of line 57, but also the pilot pressure of line 86 during emergency situations in order to provide braking functions.

A variation of this valve assembly is illustrated in FIG. 9A which similarly reduces the cost of the overall circuit by eliminating the need for an override valve while also eliminating the need for a dual piloted relay valve wherein a shuttle valve 112 responsive to the pressure of the pilot line 57 or the pressure of pilot line 86 will serve to shuttle the spring return relay valve 56 in a service application function or in an emergency function. Thus, a regular relay valve may be used in this instance wherein only a single signal is provided to the relay valve depending on the pressure in the pilot line 57 or the pressure in the pilot line 86.

A further embodiment of the control valve assembly over the embodiment of FIG. 3 is shown in FIG. 10 where the actuation of the emergency braking function does not include the use of the pneumatic electronic emergency charge valve 94. In this embodiment, the software of the car control device would be used to initiate a mechanical emergency electronically that would occur quicker than mechanically actuated emergencies. Triggering of the electronic emergency charge valve which is ported to the brake pipe 24 would pilot-actuate the pneumatic emergency backup valve 75 by allowing the return spring to connect the supply directly to the pilot line 86. Similarly, in the event that a pneumatic command is required where loss of power in the car control device is experienced, the pneumatic emergency charge valve would also be shuttled to connect the supply directly to the emergency pilot line 86 in order to initiate an emergency braking function.

A variation of this emergency actuation circuit is shown in FIG. 10A, wherein a dual-piloted pneumatic emergency charge valve 75a is normally driven against a return spring to connect the pilot line 86 to exhaust, but upon a pneumatic emergency command would be shuttled to connect the pilot line 86 to supply and for emergency braking function. Additionally, electronic emergency charge valve 95 can be actuated by an electronic signal from the car control device to apply pressure to the other side of 75a and cause an emergency braking function by connecting the supply to the pilot line 86.

Moreover, with respect to the embodiment of FIG. 10, the electronic emergency valve 95 no longer serves to actuate a pneumatic emergency charge valve, such as the valve 94, shown in FIG. 3 but is used in a different manner in the circuit.

A further embodiment of the control valve assembly of FIG. 3 is illustrated in FIG. 11, wherein it differs by including an electronic emergency override valve 114 between the brake pipe 24 and the pneumatic emergency charge valve 35. A line 115 connects between the electronic emergency override valve 114 and the pneumatic emergency charge valve 75 which prevents the mechanically actuated emergency. This circuitry would be used in situations where the pressure-sensitive emergency application allows an emergency to occur when it does not occur in a conventional braking system. Thus, the actuation of the emergency override valve 114 would prevent the pneumatic emergency situations from occurring in the emergency braking circuit of a control valve assembly.

A variation of the embodiment of FIG. 11 is shown in FIG. 11A wherein a shuttle valve 117 is disposed between the brake pipe and the line 115 going to the pneumatic emergency charge valve 75 wherein the normal brake pressure would be delivered to the line 115 and to the pneumatic emergency charge valve 75, thereby closing the exhaust port of the electronic emergency override valve 114a but would be overridden upon actuation of the valve 114a in order to prevent a mechanical actuated emergency condition. While not shown in FIG. 4, it will be appreciated that the override valve 114, 114a will be controlled by electronic signals from the CPU 17 as are the other electronically controlled valves.

Figure 12:
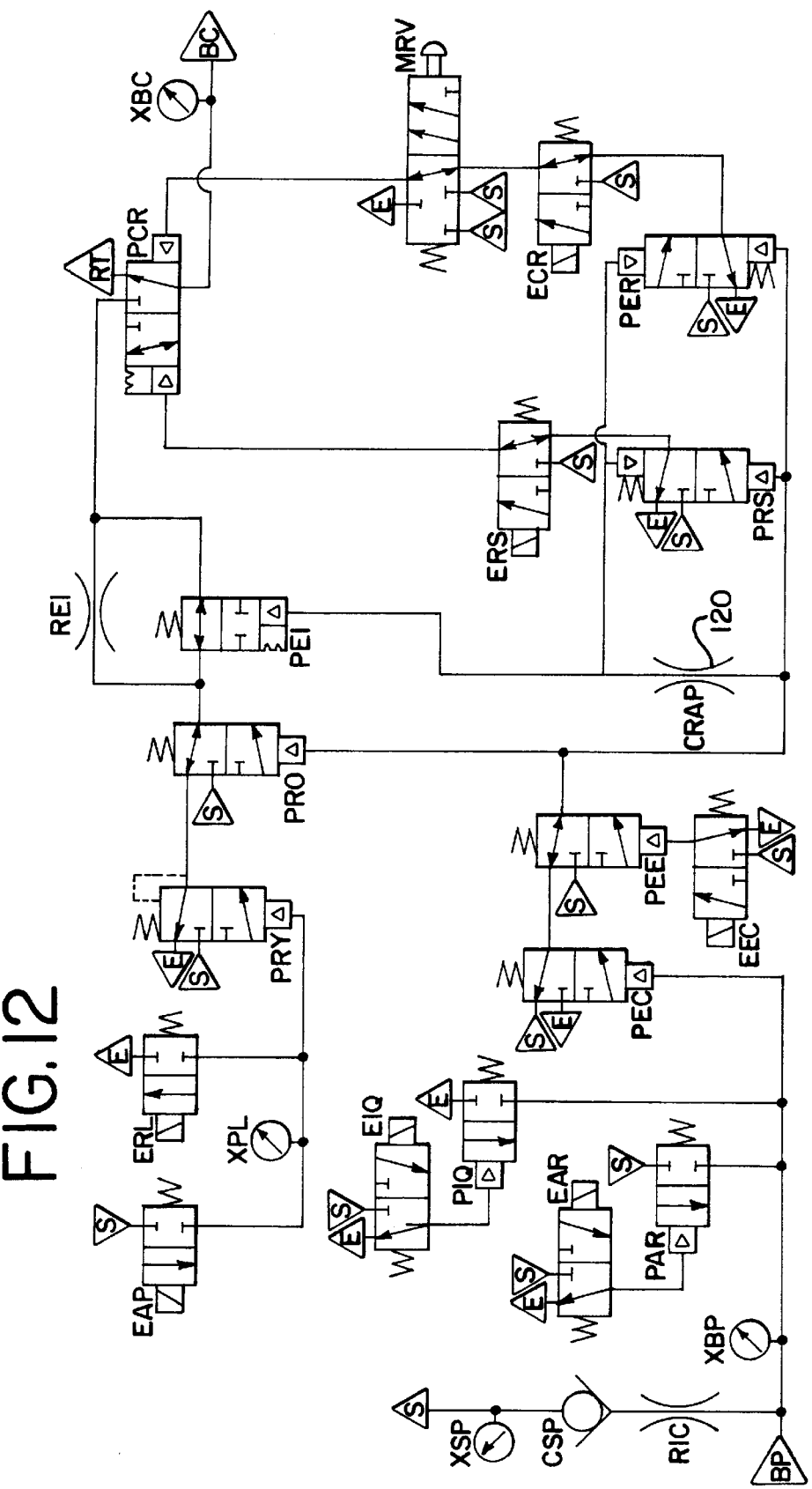
FIG. 12 is a schematic view of a pneumatic circuitry of a further modified control valve assembly of the present invention using conventional ANSI symbols and which combines the chokes shown in the embodiment of FIG. 3 into a single choke.

A further embodiment of the control valve assembly of FIG. 3 is illustrated in FIG. 12 wherein each of the chokes 85c, 88c and 90 in the bottom of FIG. 3 are combined into a single combined choke or restrictor application orifice 120. This combined choke then serves to provide a time-sensitive inshot function like the embodiment of FIG. 3, it only differing in the use of a single choke or restrictor application orifice.

Figure 13:
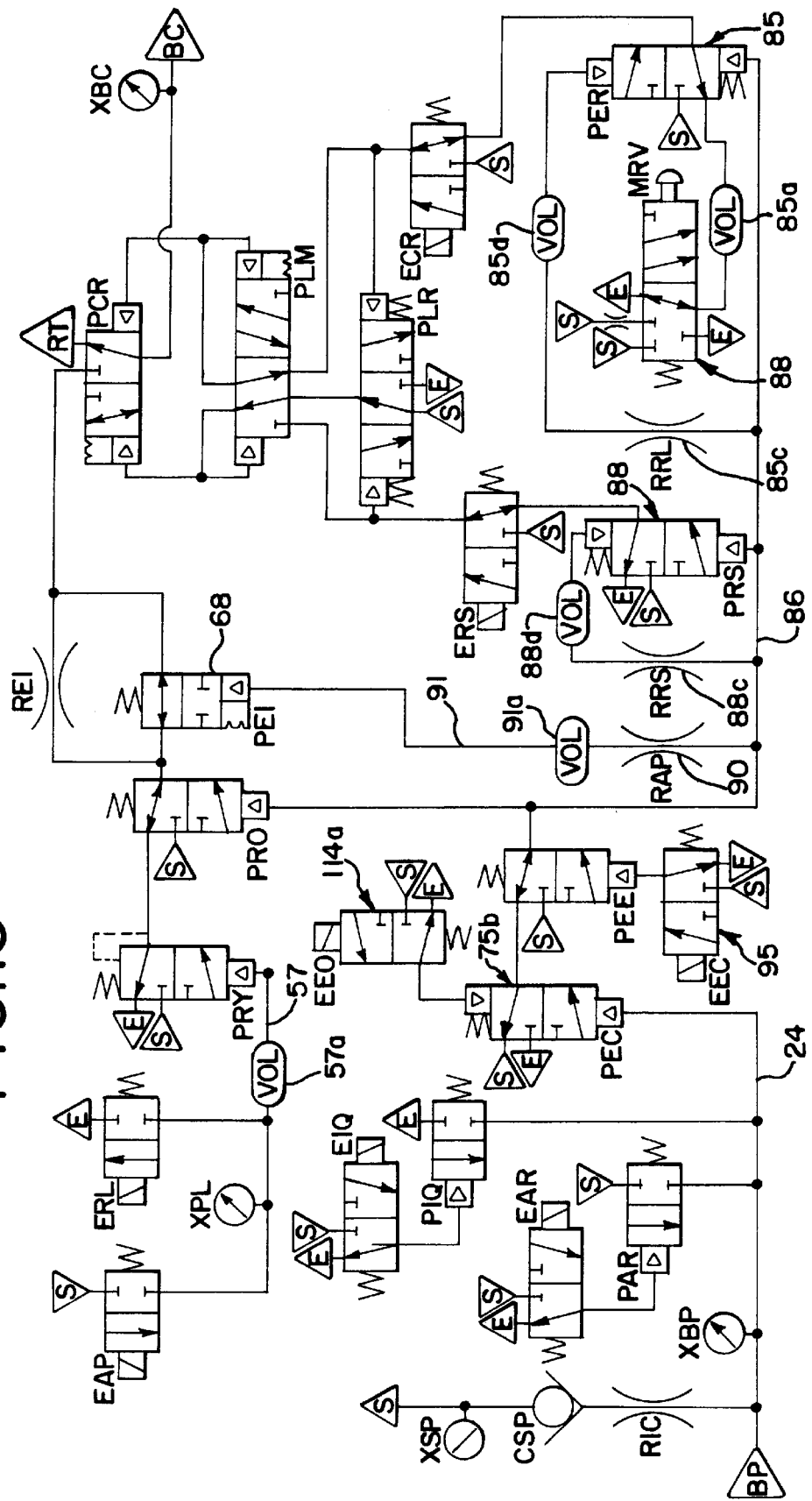
FIG. 13 is a schematic view of the pneumatic circuit of a further modified control valve assembly of the present invention using conventional ANSI symbols and which illustrates the use of volume chambers for the control valve.

A further embodiment of the control valve assembly invention is shown in FIG. 13 which differs from the embodiment of FIG. 3 primarily in the addition of volume chambers at critical zones in the pneumatic circuit. This embodiment is more particularly like the embodiment of FIG. 11 with the exception that the electronic emergency override valve 114a has been relocated and the pneumatic emergency charged valve 75b has been changed to be pneumatically driven from both ends, one end being connected to the brake pipe 24 and the other end being connected to the electronic emergency override valve 114a. This override valve 114a will serve to mechanically put the control valve in an emergency braking mode from a signal generated by the car control device which then shuttles the pneumatic emergency charge valve 75b to pressurize the emergency pilot line 86 and the emergency braking function. It will be appreciated that the volume chambers provide volume levels of pressure in the overall circuit where needed at critical times to assure proper valve operation. More specifically, a volume chamber 57a is provided in pilot line 57 in the relay valve circuit. Additionally, a volume chamber 91a is provided in the line 91 between the restrictor orifice 90 and pneumatic emergency inshot valve 68. Similarly, a volume chamber 88d is provided between the pneumatic reset valve 88c and the pneumatic reset valve 88. Finally, a volume chamber 85d is provided in the line between the restrictor emergency release orifice 85c and the pneumatic emergency release valve 85d.

Figure 14:
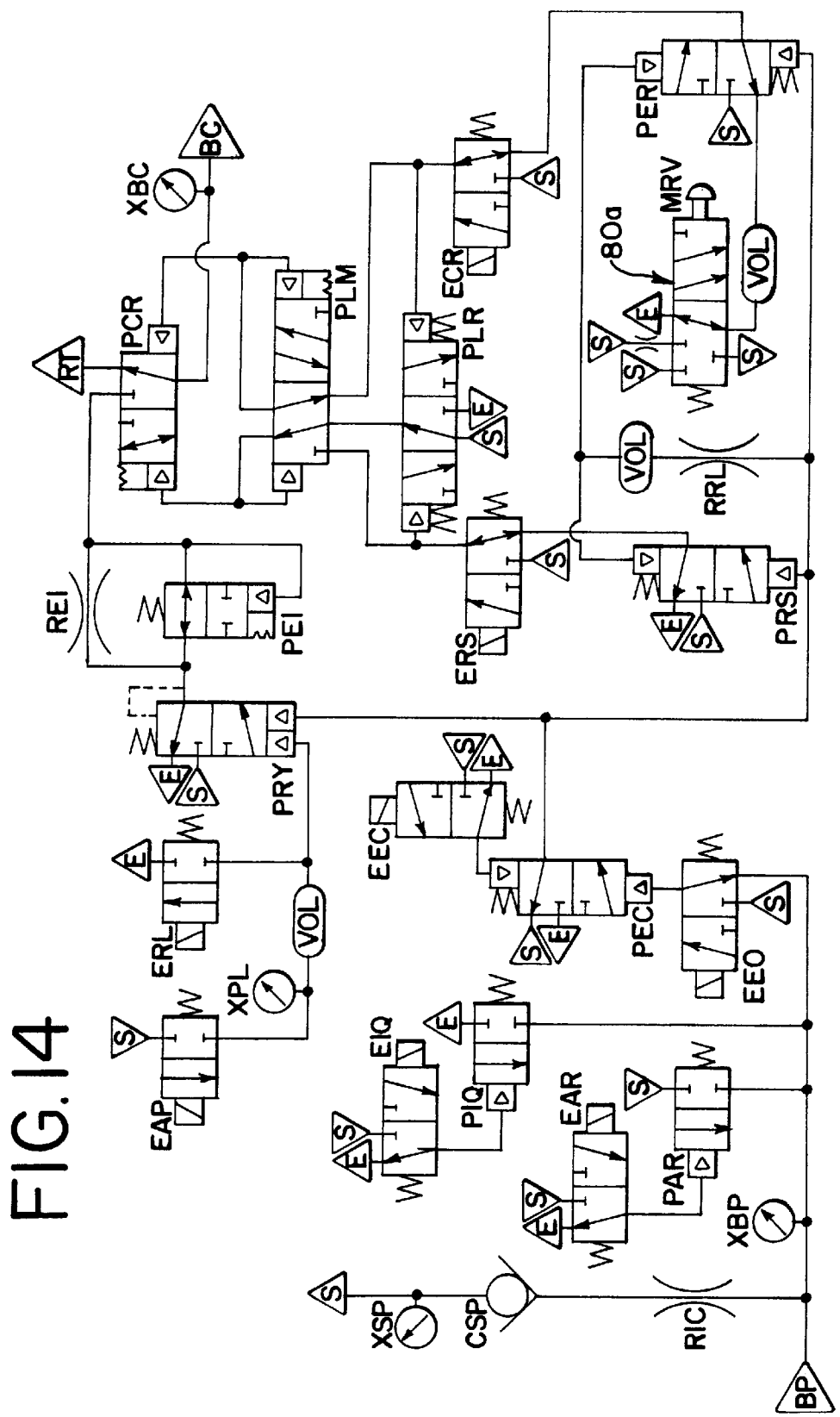
FIG. 14 is a schematic view of the pneumatic circuitry of the preferred embodiment of the control valve assembly of the present invention using conventional ANSI symbols.

The preferred control valve assembly of the present invention is illustrated in FIG. 14 which combines the features of the pressure-sensitive latching of the pneumatic cylinder release valve illustrated in FIG. 7, the pressure-sensitive inshot valve as shown in the embodiment of FIG. 8A, the electronic emergency override feature of FIGS. 11 and 11A, the volume chamber feature of the embodiment of FIG. 13, and the dual-piloted relay feature of FIG. 9, as well as the relocation of the manual release 80a. More specifically, the positive pressure latching feature for the pneumatic cylinder release valve is identical to that shown in FIG. 7, and the pressure-sensitive inshot circuitry is identical to that shown in FIG. 8A. Similarly, the dual-piloted relay valve is identical to that shown in FIG. 9. The volume chamber features are substantially like that shown in FIG. 13. The manual release valve 80a has been relocated. It functions in substantially the same way as above set forth relative to the manual release valve 80 as used in FIG. 3.

Figure 15:
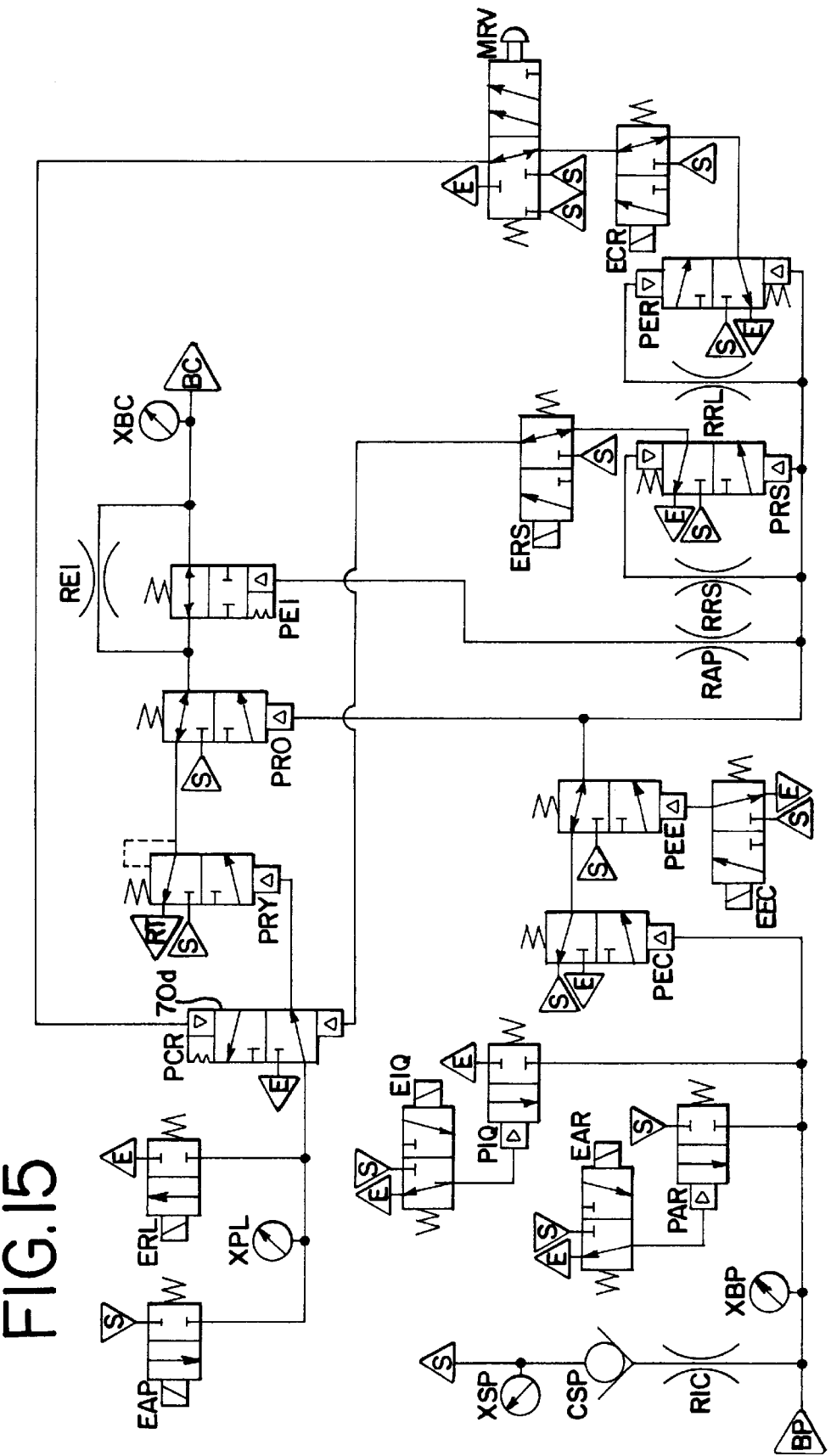
FIG. 15 is a schematic view of the pneumatic circuitry of the still further modified control valve assembly of the present invention using conventional ANSI symbols which relocates the pneumatic cylinder release valve from the location shown in the embodiment of FIG. 3.

Another embodiment of the invention is shown in FIG. 15 which differs from the embodiment of FIG. 3 in that the pneumatic cylinder release valve has been relocated to be connected between the relay valve and the electronic application and release valves which allows the valve to be of a smaller size because it does not carry the braking air flow. Otherwise, the operation of the valve assembly is like that of FIG. 3. In this embodiment the pneumatic cylinder release valve is designated by the numeral 70d and is otherwise controlled by the reset circuit and the release circuit.

The embodiment of FIG. 16 illustrates a control valve assembly that will only function in the ECP mode as it does not include the necessary features for functioning in the emulation mode in response to pneumatic command signals. This valve assembly incorporates the dual-piloted relay valve feature of the embodiment of FIG. 9 and the positive pressure latching feature of FIG. 7. It also maintains the pneumatic emergency backup valve feature in the event of loss of power in the car control device. Moreover, the cylinder release valve is not connected to the retainer valve, as all functions are continued to be handled electronically by the car control device.

Thus, in operation, the pneumatic emergency charge valve 75 is shuttled to provide a zero pressure for the emergency pilot line 86. The pneumatic cylinder release valve is shuttled by the reset valve 87 and pressure latched to connect the service pilot line 57 to the relay valve 56 for modulating the brake line pressure to the brake cylinder during service application and service release functions. As a backup in the event of loss of power to the car control device, the backup valve 75 will cause the relay valve to apply emergency braking air to the brake cylinder. Otherwise, the other components operate as in the bottom of FIG. 3 and particularly the manual release valve, the electronic cylinder release valve, and the pneumatic emergency release valve.

It will be understood that modifications and variations may be effected without departing from the scope of the novel concepts of the present invention, but it is understood that this application is to be limited only by the scope of the appended claims.

The invention is hereby claimed as follows:

1. A brake system for a train including a locomotive and a plurality of cars connected to the locomotive, intercommunicating brake pipes on the cars and locomotive, air supply means on the locomotive for supplying air to the brake pipes, each car further including an air supply reservoir, a manually operable retainer valve, a brake cylinder for producing a braking function, means for directing air from the air supply to the brake cylinder for brake application and venting that air for brake release, said air directing means on at least one of the cars further including a control valve and a car control device for operating the control valve, the control valve responding to either pneumatic signals from the brake pipe or electronic signals from the car control device, said car control valve including a pneumatically pilot operated relay valve for connecting the supply reservoir to the brake cylinder, a solenoid operated application valve responsive to a brake application signal from the car control device to produce a pilot pressure in a pilot line to said relay valve for actuating said relay valve to supply braking air to the brake cylinder, a solenoid operated release valve responding to brake release signals from the car control device venting the pilot pressure in said pilot line, a two-position pneumatically actuable brake cylinder release valve connected to said relay valve and the brake cylinder and having an exhaust connected to said retainer valve, means for latching said cylinder release valve in one position for normal service application functions, and means for driving said cylinder release valve to another position for connecting the brake cylinder to the retainer valve during exhausting of the brake cylinder, and a pneumatic emergency circuit for producing an emergency pilot pressure and providing emergency braking functions.

2. The brake system of claim 1, which further includes an electronic cylinder release valve for shuttling said brake cylinder release valve during brake release functions to exhaust brake air to said retainer valve, and pressure transducers for providing electric signals to the car control device as to brake pipe pressure, brake cylinder pressure, supply reservoir pressure and pilot line pressure to the pneumatic relay valve.

3. The brake system of claim 1, which further includes an inshot valve responding to an emergency braking signal for accelerating the flow of braking air to said brake cylinders in an emergency.

4. The brake system of claim 3, wherein said inshot means includes time-sensitive means.

5. The brake system of claim 3, wherein said inshot means includes pressure-sensitive means.

6. The brake system of claim 5, wherein said pressure-sensitive means includes means preventing inshot air flow during service applications.

7. The brake system of claim 5, wherein said pressure-sensitive means includes means for allowing inshot air flow during service and emergency applications.

8. The brake system of claim 1, wherein the car control valve is leak tolerant to assure a safer and more reliable braking operation.

9. The brake system of claim 1, which further includes an operable reset or re-apply means for resetting the brake cylinder release valve for normal service application functions.

10. The brake system of claim 9, wherein the reset or re-apply means is electronically operated.

11. The brake system of claim 9, wherein the reset or re-apply means is manually operated.

12. The brake system of claim 9, wherein the reset or re-apply means is pneumatically operated.

13. The brake system of claim 1, wherein said pneumatic emergency circuit includes a pneumatic backup valve operable in the event the car control device loses power to override the relay valve and direct braking air to the brake cylinder.

14. The brake system of claim 13, wherein said pneumatic backup valve is pilot operated by said brake pipe pressure.

15. The brake system of claim 1, which further includes an accelerated initial quick service valve to propagate a pneumatic brake application signal to other cars.

16. The brake system of claim 1, which further includes an accelerated brake application means for propagating a pneumatic brake application signal to other cars.

17. The brake system of claim 1, which further includes an accelerated release means for propagating a pneumatic brake release signal to other cars.

18. The brake system of claim 1, which further includes a conventional release stem valve for releasing and applying the brakes, and for emptying the air supply reservoir.

19. The brake system of claim 1, wherein said means for latching includes mechanical means on said valve.

20. The brake system of claim 1, wherein said means for latching includes a pneumatic latching circuit.

21. The brake system of claim 1, wherein said means for latching includes mechanical means on said valve and a pneumatic latching circuit.

22. The brake system of claim 1, wherein said pneumatic emergency circuit includes a pneumatic relay override means responding to electronic emergency signals from the car control device or pneumatic emergency signals from the brake pipe for overriding the relay valve during emergency functions to provide emergency braking air to said brake cylinders through said brake cylinder release valve.

23. The brake system of claim 22, wherein said relay override means includes a pneumatic relay override valve between said relay valve and said brake cylinder for blocking the relay valve and connecting the brake cylinder directly to said air supply.

24. The brake system of claim 22, wherein said relay override means includes pilot means for said relay valve responsive to emergency pneumatic signals from said brake pipe.

25. The brake system of claim 22, wherein said relay override means includes shuttle valve means responsive to the pilot pressure from said solenoid operated application and release valves and the emergency pneumatic signals from said brake pipe.

26. The brake system of claim 1, wherein said relay valve is dual piloted and responsive to the pilot pressure from the solenoid operated application and release valves and the pneumatic emergency circuit.

27. The brake system of claim 2, wherein said pneumatic emergency circuit includes an electronically controlled pneumatic emergency charge means for responding to a signal generated by the brake pipe pressure transducer or an electronic signal received by the car control device to override the relay valve and charge the brake cylinder.

28. The brake system of claim 27, wherein said emergency charge means includes a pilot-operated pneumatic electronic emergency charge valve (PEE) and an electronic emergency charge valve (EEC) responding to an electronic signal from the car control device to selectively provide a pilot pressure to the PEE for actuating same.

29. The brake system of claim 14, wherein said pneumatic emergency circuit further includes an electronic emergency charge valve responding to an electronic signal from the car control device to selectively condition said backup valve to allow operation of said relay valve, and on power loss to the car control device overrides the relay valve to direct braking air to the brake cylinder.

30. A brake system for a train including a locomotive and a plurality of cars connected to the locomotive, intercommunicating brake pipes on the cars and locomotive, air supply means on the locomotive for supplying air to the brake pipes, each car further including an air supply reservoir, a manually operated retainer valve, brake cylinders for producing a braking function for the car, a car control valve between the brake pipe and the air supply reservoir controlling the air pressure in said reservoir and the operation of the supply of braking air to said cylinders, and a car control device for sending electronic command signals to said car control valve, said car control valve further being responsive to pneumatic command signals from said brake pipe, said car control valve comprising:

a pilot operated relay valve for selectively supplying braking air to and exhausting braking air from said brake cylinders, electronically controlled means for controlling the pilot pressure in a pilot line to said relay valve during service application and release braking functions, pressure transducers connected to the brake pipe, brake cylinder, pilot line and air supply reservoir for providing electronic signals to said car control device corresponding to the transducer pressures, and a pneumatically actuated brake cylinder release valve for providing manual operation of said brake cylinders and service and emergency braking functions.

31. The brake system of claim 30, wherein said pneumatically actuated brake cylinder release valve includes means latching the valve in a first position for permitting service and emergency functions of providing braking air to the cylinders and in a second position for connecting the brake cylinders to exhaust the braking air to atmosphere.

32. The brake system of claim 31, wherein the pneumatically actuated brake cylinder release valve is connected between said relay valve and said brake cylinders.

33. The brake system of claim 32, wherein the pneumatically actuated brake cylinder release valve selectively connects the brake cylinders to the relay valve or a retainer valve exhaust.

34. The brake system of claim 31, wherein the pneumatically actuated brake cylinder release valve is connected between said relay valve and said pilot line.

35. The brake system of claim 31, wherein said latching means includes mechanical means on said valve.

36. The brake system of claim 31, wherein said latching means includes a pneumatic latching circuit.

37. The brake system of claim 31, wherein said latching means includes mechanical means on said valve and a pneumatic latching circuit.

38. The brake system of claim 31, which further includes inshot means responding to an emergency braking signal for accelerating the flow of braking air to said brake cylinders.

39. The brake system of claim 38, wherein said inshot means includes means making said inshot means time sensitive to an emergency signal.

40. The brake system of claim 38, wherein said inshot means includes means making said inshot means pressure sensitive to an emergency signal.

41. The Brake system of claim 30, which further includes means for responding to electronic command signals from the car control device or pneumatic command signals from the brake pipe to provide an emergency braking function including an increased braking air flow to the brake cylinders.

42. The brake system of claim 41, wherein said emergency braking function means includes a pneumatic relay override valve for blocking said relay valve and providing braking air to said braking cylinders, an inshot valve for increasing air flow to the brake cylinders, a pilot operated pneumatic emergency charge valve responding to said brake pipe pressure pneumatic command signals for driving said inshot valve to increase the braking air flow, and for actuating said override valve.

43. The brake system of claim 42, wherein said emergency braking function means further includes an electronic charge valve responding to electronic command signals from said car control device for driving said inshot valve to increase the braking air flow and actuating said override valve.

44. The brake system of claim 41, wherein said emergency braking function means includes a pneumatic relay override valve for blocking said relay valve and providing braking air to said braking cylinders, an inshot valve for increasing air flow to the brake cylinders, and means responsive to pneumatic or electronic command signals to drive the inshot and relay override valves.

45. The brake system of claim 44, wherein said inshot and relay override valves drive means includes a pilot operated pneumatic emergency charge valve responsive to pneumatic command signals from said brake pipe, a pilot operated pneumatic electronic emergency valve, and an electronic emergency charge valve driving said pneumatic electronic emergency valve in response to electronic signals from the car control device.

46. The brake system of claim 44, wherein said inshot and relay override valves drive means includes a pneumatic emergency charge valve responsive to a pneumatic command signal from the brake pipe and an electronic command signal from the car control device.

47. The brake system of claim 41, which further includes an electronic emergency override valve responsive to an electronic signal from the car control device to prevent the pneumatic command signals from triggering an emergency braking function.

48. A brake system for a train including a locomotive and a plurality of cars connected to the locomotive, intercommunicating brake pipes on the cars and locomotive, air supply means on the locomotive for supplying air to the brake pipes, each car further including an air supply reservoir, brake cylinders for producing a braking function for the car, a car control valve between the brake pipe and the air supply reservoir controlling the air pressure in said reservoir and the operation of the supply of braking air to said cylinders, and a car control device for sending electronic command signals to said car control valve, said car control valve further being responsive to pneumatic command signals from said brake pipe, said car control valve comprising:

a dual piloted relay valve having one pilot for selectively supplying braking air to and exhausting braking air from said brake cylinders in response to a first pilot pressure in a first pilot line controlled by electronic application and release valves and a second pilot overriding the first pilot pressure in response to pneumatic commands from the brake pipe in the event power is lost to the car control device, pressure transducers connected to the brake pipe, brake cylinder, first pilot line and air supply reservoir for providing electronic signals to said car control device corresponding to transducer pressures, a pneumatically actuated brake cylinder release valve for providing application, release, emergency and manual operation of said brake cylinders and service and emergency braking functions, an inshot valve between said relay valve and said cylinder release responding to an emergency braking signal for accelerating the flow of braking air to the brake cylinders, a pneumatic latching means for pneumatically latching said cylinder release valve in the brake application or emergency brake function positions, and an electronic override valve responding to an electronic signal from the car control device for preventing an emergency braking function in response to a pneumatic command signal.

49. The brake system of claim 48, wherein the car control valve further includes an electronically actuated accelerated service means for propagating a pneumatic braking command to other cars.

50. The brake system of claim 48, wherein the car control valve further includes an electronically actuated accelerated release means for propagating a pneumatic release command to other cars.

51. The brake system of claim 48, wherein the car control valve further includes pressure sensitive means for actuating said inshot valve during service applications when the downstream pressure in the brake cylinder reaches a predetermined value.

52. The brake system of claim 48, wherein the car control valve pneumatic brake cylinder release valve further includes means for mechanically latching the vale in braking or release position.

53. The brake system of claim 48, wherein the car control valve further includes a volume chamber in the pilot line from the electronic application and release valves to the relay valve.

54. The brake system of claim 48, which further includes reset or re-apply means for resetting the brake cylinder release valve for normal service application functions.

55. The brake system of claim 54, wherein said reset or re-apply means includes an electronic cylinder release valve responding to an electronic signal to cause resetting of said brake cylinder release valve, a manual release valve for resetting said brake cylinder release valve, and a pneumatic emergency release valve for resetting said brake cylinder release valve.

56. The brake system of claim 55, wherein the car control valve further includes a volume chamber between the manual release valve and the pneumatic emergency release valve.

57. The brake system of claim 48, wherein the car control valve further includes a pneumatic backup valve responsive to the brake pipe pressure in the event the car control device loses power to actuate the relay valve for an emergency braking function.

58. A brake system for a train including a locomotive and a plurality of cars connected to the locomotive, intercommunicating brake pipes on the cars and locomotive, air supply means on the locomotive for supplying air to the brake pipes, each car further including an air supply reservoir, brake cylinders for producing a braking function for the car, a car control valve between the brake pipe and the air supply reservoir controlling the air pressure in said reservoir and the operation of the supply of braking air to said cylinders, and a car control device for sending electronic command signals to said car control valve, a dual piloted relay valve having one pilot for selectively supplying braking air to and exhausting braking air from said brake cylinders in response to a first pilot pressure in a first pilot line controlled by electronic application and release valves and a second pilot overriding the first pilot pressure in response to pneumatic commands from the brake pipe in the event power is lost to the car control device, pressure transducers connected to the brake pipe, brake cylinder, first pilot line and air supply reservoir for providing electronic signals to said car control device corresponding to transducer pressures, a pneumatically actuated brake cylinder release valve for providing application, release, emergency and manual operation of said brake cylinders and service and emergency braking functions, a pneumatic latching means for pneumatically latching said cylinder release valve in the brake application or emergency brake function positions, reset or re-apply means for resetting the brake cylinder release valve for normal service application functions, and a pneumatic backup valve responsive to the brake pipe pressure in the event the car control device loses power to actuate said relay valve for an emergency braking function.

59. A brake system for a train including a locomotive and a plurality of cars connected to the locomotive, intercommunicating brake pipes on the cars and locomotive, air supply means on the locomotive for supplying air to the brake pipes, each car further including an air supply reservoir, a manually operated retainer valve, brake cylinders for producing a braking function for the car, a car control valve between the brake pipe and the air supply reservoir controlling the air pressure in said reservoir and the operation of the supply of braking air to said cylinders, and a car control device for sending electronic command signals to said car control valve, said car control valve further being responsive to pneumatic command signals from said brake pipe, said car control valve comprising:

a pilot operated relay valve for selectively supplying braking air to and exhausting braking air from said brake cylinders, electronically controlled means for controlling the pilot pressure in a pilot line to said relay valve during service application and release braking functions, pressure transducers connected to the brake pipe, pilot line and air supply reservoir for providing electronic signals to said car control device corresponding to the transducer pressures, and a pneumatically actuated brake cylinder release valve for providing manual operation of said brake cylinders and service and emergency braking functions.

\* \* \* \* \*